United States Patent
Shirakawa et al.

(10) Patent No.: US 12,459,984 B2
(45) Date of Patent: Nov. 4, 2025

(54) CANCER GENE THERAPY DRUG

(71) Applicant: NATIONAL UNIVERSITY CORPORATION KOBE UNIVERSITY, Hyogo (JP)

(72) Inventors: Toshiro Shirakawa, Hyogo (JP); Naoto Kunimura, Hyogo (JP); Koichi Kitagawa, Hyogo (JP)

(73) Assignee: NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 700 days.

(21) Appl. No.: 17/789,447

(22) PCT Filed: Dec. 16, 2020

(86) PCT No.: PCT/JP2020/046891
§ 371 (c)(1),
(2) Date: Jun. 27, 2022

(87) PCT Pub. No.: WO2021/131944
PCT Pub. Date: Jul. 1, 2021

(65) Prior Publication Data
US 2023/0067359 A1    Mar. 2, 2023

(30) Foreign Application Priority Data
Dec. 27, 2019  (JP) .................................. 2019-239677

(51) Int. Cl.
| | |
|---|---|
| C07K 14/705 | (2006.01) |
| A61K 38/00 | (2006.01) |
| A61K 48/00 | (2006.01) |
| A61P 35/00 | (2006.01) |
| C07K 14/47 | (2006.01) |
| C12N 15/62 | (2006.01) |
| C12N 15/86 | (2006.01) |

(52) U.S. Cl.
CPC ........ *C07K 14/70596* (2013.01); *A61P 35/00* (2018.01); *C07K 14/47* (2013.01); *C07K 14/705* (2013.01); *C12N 15/625* (2013.01); *C12N 15/86* (2013.01); *A61K 38/00* (2013.01); *A61K 48/00* (2013.01); *C12N 2750/14143* (2013.01)

(58) Field of Classification Search
None
See application file for complete search history.

(56) References Cited

U.S. PATENT DOCUMENTS

2023/0067359 A1    3/2023    Shirakawa et al.

FOREIGN PATENT DOCUMENTS

| | | | |
|---|---|---|---|
| JP | 2017-504601 A | 2/2017 | |
| JP | 2018-506293 A | 3/2018 | |
| JP | 2019-528077 A | 10/2019 | |
| WO | WO 2015/092024 A2 | 6/2015 | |
| WO | WO 2016/138034 A1 | 9/2016 | |
| WO | WO 2018/039247 A1 | 3/2018 | |
| WO | WO-2019213517 A1 * | 11/2019 | ............. A61K 38/00 |
| WO | WO 2021/131944 A1 | 7/2021 | |

OTHER PUBLICATIONS

Schaefer and Rost, "Predict impact of single amino acid change upon protein structure" BMC Genomics (Year: 2012).*
Ishiwatari-Hayasaka et al., Requirements for Signal Delivery Through CD44: Analysis Using CD44-Fas Chimeric Proteins, The Journal of Immunology, 1999, pp. 1258-1264, vol. 163.
Kosaki et al., Overproduction of Hyaluronan by Expression of the Hyaluronan Synthase Has2 Enhances Anchorage-independent Growth and Tumorigenicity, Cancer Res, Mar. 1, 1999, pp. 1141-1145, vol. 59, No. 5.
Bourguignon et al., CD44 Interaction with c-Src Kinase Promotes Cortactin-mediated Cytoskeleton Function and Hyaluronic Acid-dependent Ovarian Tumor Cell Migration, The Journal of Biological Chemistry, Mar. 9, 2001, pp. 7327-7336, vol. 276, No. 10.
Fujita et al., CD44 signaling through focal adhesion kinase and its anti-apoptotic effect, FEBS Letters, Aug. 23, 2002, pp. 101-108, vol. 528, No. 1-3.
Bazil et al., Shedding of the CD44 Adhesion Molecule From Leukocytes Induced By ANTI-CD44 Monoclonal Antibody Simulating the Effect of a Natural Receptor Ligand, The Journal of Immunology, Aug. 1, 1992, pp. 747-753, vol. 149, No. 3.
Murakami et al., Presenilin-dependent γ-secretase activity mediates the intramembranous cleavage of CD44, Oncogene, 2003, pp. 1511-1516, vol. 22.
Ueda et al., Radiolabeled Probes Targeting Hypoxia-Inducible Factor-1-Active Tumor Microenvironments, The Scientific World Journal, 2014, pp. 1-8, vol. 2014, Article ID 165461.
Gao et al., Arsenite induces HIF-1α and VEGF through PI3K, Akt and reactive oxygen species in DU145 human prostate carcinoma cells, Molecular and Cellular Biochemistry, 2004, pp. 33-45, vol. 255, No. 1-2.
Kopan et al., The Canonical Notch Signaling Pathway: Unfolding the Activation Mechanism, Cell, NIH Public Access Author Manuscript, Apr. 17, 2009, pp. 216-233 vol. 137, No. 2.
Dougherty et al. A Cancer Gene Therapy Approach that Targets Tumor-associated Hyaluronan, Cancer Growth and Metastasis, 2009, pp. 29-43, vol. 2.
Morsut et al., Engineering Customized Cell Sensing and Response Behaviors Using Synthetic Notch Receptors, Cell, HHS Public Access Author Manuscript, Feb. 11, 2016, pp. 780-791, vol. 164, No. 4.

(Continued)

*Primary Examiner* — Robert M Kelly
*Assistant Examiner* — John David Moore
(74) *Attorney, Agent, or Firm* — Paratus Law Group, PLLC

(57) ABSTRACT

Provided is a novel cancer gene therapeutic means. More specifically, provided is a nucleic acid having a structure in which (A) a nucleic acid encoding a protein having a CD44 extracellular function, (B) a nucleic acid encoding a protein having a Notch core region function, and (C) a nucleic acid encoding a protein having an HIF-3α4 function are linked in the order of (A)-(B)-(C).

20 Claims, 17 Drawing Sheets

Specification includes a Sequence Listing.

(56) References Cited

OTHER PUBLICATIONS

Makino et al., Inhibitory PAS domain protein is a negative regulator of hypoxia-inducible gene expression, Nature, Nov. 29, 2001, pp. 550-554, vol. 414, No. 6863.

Maynard et al., Human HIF-3α4 is a dominant-negative regulator of HIF-1 and is down-regulated in renal cell carcinoma, The FASEB Journal, Sep. 2005, pp. 1396-1406, vol. 19, No. 11.

Zhang et al., p16 Modulates VEGF Expression via Its interaction With HIF-1α in Breast Cancer Cells, Cancer Investigation, Jul. 2010, pp. 588-597, vol. 28(6).

Noblitt et al., Decreased tumorigenic potential of EphA2-oberexpressing breast cancer cells following treatment with adenoviral vectors that express EphrinA1, Cancer Gene Therapy, 2004, pp. 757-766, vol. 11.

Semenza, A compendium of proteins that interact with HIF-1α, Experimental Cell Research, 2017, pp. 128-135, vol. 356.

Ruhan A et al., A recombinant adenovirus vector containing the synNotch receptor gene for the treatment of triple-negative breast cancer, Frontiers In Oncology, Mar. 2023, pp. 1-14, vol. 13.

Senbanjo et al., CD44: A Multifunctional Cell Surface Adhesion Receptor Is a Regulator of Progression and Metastasis of Cancer Cells, Frontiers in Cell and Developmental Biology, Mar. 2017, pp. 1-6, vol. 5.

Dec. 11, 2023, European Search Report issued for related EP Application No. 20908300.5.

* cited by examiner

Fig.1

```
   1  atg gac aag ttt tgg tgg cac gca gcc tgg gga ctc tgc ctc gtg ccg ctg agc ctg gcg cag atc gat ttg aat ata acc
       M   D   K   F   W   W   H   A   A   W   G   L   C   L   V   P   L   S   L   A   Q   I   D   L   N   I   T
  82  tgc cgc ttt gca ggt gta ttc cac gtg gag aaa aat ggt cgc tac agc atc tct cgg acg gag gcc gct gac ctc tgc aag
       C   R   F   A   G   V   F   H   V   E   K   N   G   R   Y   S   I   S   R   T   E   A   A   D   L   C   K
 163  gct ttc aat agc acc ttg ccc aca atg gcc cag atg gag aaa gct ctg agc atc gga ttt gag acc tgc agg tat ggg ttc
       A   F   N   S   T   L   P   T   M   A   Q   M   E   K   A   L   S   I   G   F   E   T   C   R   Y   G   F
 244  ata gaa ggg cac gtg gtg att ccc cgg atc cac ccc aac tcc atc tgt gca gca aac aac aca ggg gtg tac atc ctc
       I   E   G   H   V   V   I   P   R   I   H   P   N   S   I   C   A   A   N   N   T   G   V   Y   I   L
 323  aca tcc aac acc tcc cag tat gac aca tat tgc ttc aat gct tca gct cca cct gaa gaa gat tgt aca tca gtc aca gac
       T   S   N   T   S   Q   Y   D   T   Y   C   F   N   A   S   A   P   P   E   E   D   C   T   S   V   T   D
 403  ctg ccc aat gcc ttt gat gga cca att acc ata act att gtt aac cgt gat ggc acc cgt tat gtc cag aaa gga gaa tac
       L   P   N   A   F   D   G   P   I   T   I   T   I   V   N   R   D   G   T   R   Y   V   Q   K   G   E   Y
 484  aga acg aat cct gaa gac atc tac ccc agc aac cct act gat gat gac gtg agc agc ggc tcc tcc agt gaa agg agc
       R   T   N   P   E   D   I   Y   P   S   N   P   T   D   D   D   V   S   S   G   S   S   E   R   S
 562  agc act tca gga ggt tac atc ttt tac acc ttt tct act gta cac ccc atc cca gac gaa gac agt ccc tgg atc acc gac
       S   T   S   G   G   Y   I   F   Y   T   F   S   T   V   H   P   I   P   D   E   D   S   P   W   I   T   D
 643  agc aca gac aga atc cct gct acc aga cac tca cat ggg agt caa gaa ggt gga gca aac aca acc tct ggt cct ata
       S   T   D   R   I   P   A   T   R   H   S   H   G   S   Q   E   G   G   A   N   T   T   S   G   P   I
 721  agg aca ccc caa att
       R   T   P   Q   I
 736  atc ctg gac tac agc ttc ggg ggt ggg gcc ggg cgc gac atc ccc ccg ccg ctg atc gag gag gcg tgc gag ctg ccc gag tgc cag gag
       I   L   D   Y   S   F   G   G   G   A   G   R   D   I   P   P   P   L   I   E   E   A   C   E   L   P   E   C   Q   E
 826  gac gcg ggc aac aag gtc tgc agc ctg cag tgc aac aac cac gcg tgc ggc tgg gac ggc ggt gac tgc tcc ctc aac ttc aat gac ccc
       D   A   G   N   K   V   C   S   L   Q   C   N   N   H   A   C   G   W   D   G   G   D   C   S   L   N   F   N   D   P
 916  tgg aag aac tgc acg cag tct ctg cag tgc tgg aag tac ttc agt gac ggc cac tgt gac agc cag tgc aac tca gcc ggc tgc ctc ttc gac
       W   K   N   C   T   Q   S   L   Q   C   W   K   Y   F   S   D   G   H   C   D   S   Q   C   N   S   A   G   C   L   F   D
1009  ggc ttt gac tgc cag cgt gcg gaa ggc cag tgc aac ccc ctg tac gac cag tac tgc aag gac cac ttc agc gac ggg cac tgc gac cag
       G   F   D   C   Q   R   A   E   G   Q   C   N   P   L   Y   D   Q   Y   C   K   D   H   F   S   D   G   H   C   D   Q
1099  ggc tgc aac agc gcg gag tgc gag tgg gac ggg ctg gac tgt gcg gag cat gta ccc gag agg ctg gcg gcc ggc acg ctg gtg gtg gta
       G   C   N   S   A   E   C   E   W   D   G   L   D   C   A   E   H   V   P   E   R   L   A   A   G   T   L   V   V   V
1189  gtg ctg atg ccg ccg gag cag ctg cgc aac agc tcc ttc cac ttc ctg cgg gag ctc agc cgc gtg ctg cac acc aac gtg gtc ttc aag cgt
       V   L   M   P   P   E   Q   L   R   N   S   S   F   H   F   L   R   E   L   S   R   V   L   H   T   N   V   V   F   K   R
1282  gac gca cac ggc cag cag atg atc ttc ccc tac tac ggc cgc gag gag gag ctg cgc aag cac ccc atc aag cgt gcc gcc gag ggc tgg
       D   A   H   G   Q   Q   M   I   F   P   Y   Y   G   R   E   E   E   L   R   K   H   P   I   K   R   A   A   E   G   W
1372  gcc gca cct gac gcc ctg ctg ggc cag gtg aag gcc tcg ctc ccg ggc agc gag ggg agg cgg cgc cgg gag ctg gac ccc
       A   A   P   D   A   L   L   G   Q   V   K   A   S   L   L   P   G   G   S   E   G   G   R   R   R   R   E   L   D   P
1462  atg gac gtc cgc ggc tcc atc gtc tac ctg gag att gac aac cgg cag tgt gtg cag gcc tcc tcg cag tgc ttc cag agt gcc acc gac gtg
       M   D   V   R   G   S   I   V   Y   L   E   I   D   N   R   Q   C   V   Q   A   S   S   Q   C   F   Q   S   A   T   D   V
1555  gcc gca ttc ctg gga gcg ctc gcc tcg ctg ggc agc ctc aac atc ccc tac aag atc gag gcc gtg cag agt gag acc gtg gag ccg ccc
       A   A   F   L   G   A   L   A   S   L   G   S   L   N   I   P   Y   K   I   E   A   V   Q   S   E   T   V   E   P   P
1645  ccg ccg gcg cag ctg cac ttc atg tac gtg gcg gcg gcc gtt gtg ctt ctg ttc ttc gtg ggc tgc ggg gtg ctg ctg tcc cgc aag cgc
       P   P   A   Q   L   H   F   M   Y   V   A   A   A   F   V   L   L   F   F   V   G   C   G   V   L   L   S   R   K   R
1738  cgg cgg cag cat ggc cag ctc tgg ttc
       R   R   Q   H   G   Q   L   W   F
1765  atg gcg ctg ggg ctg cag cgc gca agg tcg acc acg gag ctg cgc aag gaa aag tcc cgg gat gcg gcc cgc agc cgg
       M   A   L   G   L   Q   R   A   R   S   T   T   E   L   R   K   E   K   S   R   D   A   A   R   S   R
1843  cgc agc cag gag acc gag gtg ctg tac cag ctg gct cac acg ctg ccc ttc gcc cgc ggc gtc agc gcc cac ctg gac aag
       R   S   Q   E   T   E   V   L   Y   Q   L   A   H   T   L   P   F   A   R   G   V   S   A   H   L   D   K
1924  gcc tct atc atg cgc ctc acc atc agc tac ctg cgc atg cac cgc ctc tgc gca gca ggg gag tgg aac cag gtg gga gca
       A   S   I   M   R   L   T   I   S   Y   L   R   M   H   R   L   C   A   A   G   E   W   N   Q   V   G   A
2005  ggg gga gaa cca ctg gat gcc tgc tac ctg aag gcc ctg gag ggc ttc gtc atg gtg ctc acc gcc gag gga gac atg
       G   G   E   P   L   D   A   C   Y   L   K   A   L   E   G   F   V   M   V   L   T   A   E   G   D   M
2083  gct tac ctg tcg gag aat gtc agc aaa cac ctg ggc ctc agt cag ctg gag ctc att gga cac agc atc ttt gat ttc atc
       A   Y   L   S   E   N   V   S   K   H   L   G   L   S   Q   L   E   L   I   G   H   S   I   F   D   F   I
2164  cac ccc tgt cag caa gga ggt ctt cag gac gcc acc ccc cag caa ctg tcc agg agg aag gtg gag gcc
       H   P   C   Q   E   E   L   Q   D   A   L   T   P   Q   Q   T   L   S   R   R   K   V   E   A   P
2243  acg gag cgg tgc ttc tcc ttg cgc atg aag agt acg ctc acc agc cgc ggg cgc acc ctc aac ctc aag gcg gcc acc tgg
       T   E   R   C   F   S   L   R   M   K   S   T   L   T   S   R   G   R   T   L   N   L   K   A   A   T   W
2323  aag gtg ctg aac tgc tct gga cat atg agg gcc tac aag cca cct gcg cag act tct cca gct ggg agc cct gac tca
       K   V   L   N   C   S   G   H   M   R   A   Y   K   P   P   A   Q   T   S   P   A   G   S   P   D   S
2401  gag ccc ctg cag tgc ctg gtg ctg atc tgt gaa gca atc ccc cac ccc agc ctg gag ccc ctg ggc agg
       E   P   P   L   Q   C   L   V   L   I   C   E   A   I   P   H   P   G   S   L   E   P   P   L   G   R   G
2482  gcc ttc ctc agc cgc cac agc ctg gac atg aag ttc acc tac tgt gac gac agg att gca gaa gtg gct ggc tat agt ccc
       A   F   L   S   R   H   S   L   D   M   K   F   T   Y   C   D   D   R   I   A   E   V   A   G   Y   S   P
2563  gat gac ctg atc ggc tgt tcc gcc tac gag tac atc cac gcg ctg gac tcc gac gcg gtc agc aag agc atc cac acc tgt
       D   D   L   I   G   C   S   A   Y   E   Y   I   H   A   L   D   S   D   A   V   S   K   S   I   H   T   C
2644  atg tat ccc att tcc cca ggt gcg aag cca gct gcc aca tgg ccc cca gct gac acc agg acc ccc cag ctc ccc ata ccc
       M   Y   P   I   S   P   G   A   K   P   A   A   T   W   P   P   A   D   T   R   T   P   Q   L   P   I   P
2725  cag gat gca ctg cct ccc cac ctc aac acc agc tcc ctg cct aag ccc caa gga act gtc tcc ttc ctt gcc cca tca
       Q   D   A   L   P   P   H   L   N   T   S   S   L   P   K   P   Q   G   T   V   S   F   L   A   P   S
2806  tac cca gtc ccc aga tct ttc tct ccc cat ttg ccc cct tgg tgg ccc
       Y   P   V   P   R   S   F   S   P   H   L   P   P   W   W   P
```

(GenBank: FJ216964.1)

atggacaagttttggtggcacgcagcctggggactctgcctcgtgccgctgagcctggcgcagatcgatttgaatataacctgccgctttgcaggtgtattccacgt ggagaaaaatggtcgctacagcatctctcggacggaggccgctgacctctgcaaggctttcaatagcaccttgcccacaatggcccagatggagaaagctctg agcatcggatttgagacctgcaggtatgggttcatagaagggcacgtggtgattccccggatccacccccaactccatctgtgcagcaaacaacacaggggtgta catcctcacatccaacacctcccagtatgacacatattgcttcaatgcttcagctccacctgaagaagattgtacatcagtcacagacctgcccaatgcctttgatg gaccaattaccataactattgttaaccgtgatggcacccgctatgtccagaaaggagaatacagaacgaatcctgaagacatctaccccagcaaccctactgat gatgacgtgagcagcggctcctccagtgaaaggagcagcacttcaggaggttacatcttttacacctttctactgtacaccccatcccagacgaagacagtccc tggatcaccgacagcacagacagaatccctgctaccagacactcacatggggagtcaagaaggtggagcaaacacaacctctggtcctataaggacacccca aattccagaatggctgatcatcttggcatccctcttggccttggctttgattcttgcagtttgcattgcagtcaacagtcgaagaaggtgtgggcagaagaaaaagct agtgatcaacagtggcaatggagctgtggaggacagaaagccaagtggactcaacggagaggccagcaagtctcaggaaatggtgcatttggtgaacaagg agtcgtcagaaactccagaccagtttatgacagctgatgagacaaggaacctgcagaatgtggacatgaagattggggtgtaa

(GenBank: ACI46596.1)

MDKFWWHAAWGLCLVPLSLAQIDLNITCRFAGVFHVEKNGRYSISRTEAADLCKAFNSTLPTMAQMEKALSIGFET

CRYGFIEGHVVIPRIHPNSICAANNTGVYILTSNTSQYDTYCFNASAPPEEDCTSVTDLPNAFDGPITITIVNRDGTRYV

QKGEYRTNPEDIYPSNPTDDDVSSGSSSERSSTSGGYIFYTFSTVHPIPDEDSPWITDSTDRIPATRHSHGSQEGGA

NTTSGPIRTPQIPEWLILASLLALALILAVCIAVNSRRRCGQKKKLVINSGNGAVEDRKPSGLNGEASKSQEMVHLVN

KESSETPDQFMTADETRNLQNVDMKIGV

Fig. 2b-1

Notch (GenBank: AF308602.1)

atgccgccgctcctggcgccctgctctgcctggcgctgctgcccgcgctcgccgcacgaggcccgcgatgctcccagcccggtgagacctgcctgaatggcg ggaagtgtgaagcggccaatggcacggaggcctgcgtctgtggcggggccttcgtgggcccgcgatgccaggaccccaacccgtgcctcagcacccctgca agaacgccgggacatgccacgtggtggaccgcagaggcgtggcagactatgcctgcagctgtgccctgggcttctctgggcccctctgcctgacacccctgga caacgcctgcctcaccaacccctgccgcaacggggcacctgcgacctgctcacgctgacggagtacaagtgccgctgcccgcccggctggtcagggaaatc gtgccagcaggctgacccgtgcgcctccaacccctgcgccaacggtggccagtgcctgcccttcgaggcctcctacatctgccactgcccacccagcttccatg gccccacctgccggcaggatgtcaacgagtgtggccagaagcccaggctttgccgccacggaggcacctgccacaacgaggtcggctcctaccgctgcgtct gccgcgccacccacactggccccaactgcgagcggccctacgtgccctgcagcccctcgccctgccagaacggggggcacctgccgccccacgggcgacgtc acccacgagtgtgcctgcctgccaggcttcaccggccagaactgtgaggaaaatatcgacgattgtccaggaaacaactgcaagaacggggtgcctgtgtgg acggcgtgaacacctacaactgcccgtgcccgccagagtggacaggtcagtactgtaccgaggatgtggacgagtgccagctgatgccaaatgcctgccaga acggcgggacctgccacaacacccacggtggctacaactgcgtgtgtgtcaacggctggactggtgaggactgcagcgagaacattgatgactgtgccagcg ccgcctgcttccacggcgccacctgccatgaccgtgtggcctccttttactgcgagtgtccccatggccgcacaggtctgctgtgccacctcaacgacgcatgcat cagcaaccctgtaacgagggctccaactgcgacaccaaccctgtcaatggcaaggccatctgcacctgcccctcggggtacacgggcccggcctgcagcc aggacgtggatgagtgctcgctgggtgccaaccctgcgagcatgcgggcaagtgcatcaacacgctgggctccttcgagtgccagtgtctgcagggctacac gggccccgatgcgagatcgacgtcaacgagtgcgtctcgaacccgtgccagaacgacgccacctgcctggaccagattggggagttccagtgcatgtgcatg cccggctacgagggtgtgcactgcgaggtcaacacagacgagtgtgccagcagcccctgcctgcacaatggccgctgcctggacaagatcaatgagttccagt gcgagtgccccacgggcttcactgggcatctgtgccagtacgatgtggacgagtgtgccagcaccccctgcaagaatggtgccaagtgcctggacggaccccaa (CONT.)

(Fig. 2b-1 CONTINUED)

cacttacacctgtgtgtgcacggaagggtacacggggacgcactgcgaggtggacatcgatgagtgcgaccccgacccctgccactacggctcctgcaagga cggcgtcgccaccttcacctgcctctgccgcccaggctacacggggccaccactgcgagaccaacatcaacgagtgctccagccagccctgccgcctacgggg cacctgccaggacccggacaacgcctacctctgcttctgcctgaaggggaccacaggacccaactgcgagatcaacctggatgactgtgccagcagccctg cgactcgggcacctgtctggacaagatcgatggctacgagtgtgcctgtgagccgggctacacagggagcatgtgtaacagcaacatcgatgagtgtgcgggc aacccctgccacaacgggggcacctgcgaggacggcatcaatggcttcacctgccgctgccccgagggctaccacgacccacctgcctgtctgaggtcaat gagtgcaacagcaaccectgcgtccacggggcctgccgggacagcctcaacgggtacaagtgcgactgtgaccctgggtggagtgggaccaactgtgacatc aacaacaacgagtgtgaatccaaccccttgtgtcaacggcggcacctgcaaagacatgaccagtggcatcgtgtgcacctgccgggagggcttcagcggtccc aactgccagaccaacatcaacgagtgtgcgtccaacccatgtctgaacaagggcacgtgtattgacgacgttgccgggtacaagtgcaactgcctgctgcccta cacaggtgccacgtgtgaggtggtgctggccccgtgtgcccccagcccctgcagaaacggcggggagtgcaggcaatcc

Fig. 2b-2 gaggactatgagagcttctcctgtgtctgccccacggctggggccaaagggcagacctgtgaggtcgacatcaacgagtgcgttctgagcccgtgccggcacg gcgcatcctgccagaacacccacggcgsstaccgctgccactgccaggccggctacagtgggcgcaactgcgagaccgacatcgacgactgccggcccaa cccgtgtcacaacgggggctcctgcacagacggcatcaacacggccttctcgactgcctgcccggcttccggggcactttctgtgaggaggacatcaacgagt gtgccagtgaccctgccgcaacggggccaactgcacggactgcgtggacagctacacgtgcacctgccccgcaggcttcagcgggatccactgtgagaaca acacgcctgactgcacagagagctcctgcttcaacggtggcacctgcgtggacggcatcaactcgttcacctgcctgtgtccacccggcttcacgggcagctact gccagcacgtagtcaatgagtgcgactcacgaccctgcctgctaggcggcacctgtcaggacggtcgcggtctccacaggtgcacctgcccccagggctacac tggccccaactgccagaaccttgtgcactggtgtgactcctcgccctgcaagaacggcggcaaatgctggcagacccacacccagtaccgctgcgagtgcccc agcggctggaccggcctttactgcgacgtgcccagcgtgtcctgtgaggtggctgcgcagcgacaaggtgttgacgttgcccgcctgtgccagcatggagggct ctgtgtggacgcgggcaacacgcaccactgccgctgccaggcgggctacacaggcagctactgtgaggacctggtggacgagtgctcacccagcccctgcca gaacggggccacctgcacggactacctgggcggctactcctgcaagtgcgtggccggctaccacggggtgaactgctctgaggagatcgacgagtgcctctcc cacccctgccagaacggggggcacctgcctcgacctccccaacacctacaagtgctcctgcccacggggcactcagggtgtgcactgtgagatcaacgtggac gactgcaatcccccgttgaccccgtgtccggagccccaagtgctttaacaacggcacctgcgtggaccaggtgggcggctacagctgcacctgcccgccgg gcttcgtgggtgagcgctgtgagggggatgtcaacgagtgcctgtccaatccctgcgacgcccgtggcacccagaactgcgtgcagcgcgtcaatgacttccac tgcgagtgccgtgctggtcacaccgggcgccgctgcgagtccgtcatcaatggctgcaaaggcaagccctgcaagaatggggcacctgcgccgtggcctcc aacaccgcccgcgggttcatctgcaagtgccctgcgggcttcgagggcgccacgtgtgagaatgacgctcgtacctgcggcagcctgcgctgcctcaacggcg gcacatgcatctccggcccgcgcagccccacctgcctgtgcctgggcccttcacgggccccgaatgccagttcccggccagcagccctgcctgggcggcaa cccctgctacaaccaggggacctgtgagcccacatccgagagccccttctaccgttgcctgtgccccgccaaattcaacgggctcttgtgccacatcctggacta (CONT.)

(Fig. 2b-2 CONTINUED)

cagcttcggggtggggccgggcgcgacatcccccgccgctgatcgaggaggcgtgcgagctgcccgagtgccaggaggacgcgggcaacaaggtctgc agcctgcagtgcaacaaccacgcgtgcggctgggacggcggtgactgctccctcaacttcaatgaccctggaagaactgcacgcagtctctgcagtgctgga agtacttcagtgacggccactgtgacagccagtgcaactcagccggctgcctcttcgacggctttgactgccagcgtgcggaaggccagtgcaacccctgtac gaccagtactgcaaggaccacttcagcgacgggcactgcgaccagggctgcaacagcgcggagtgcgagtgggacgggctggactgtgcggagcatgtacc cgagaggctggcggccggcacgctggtggtggtggtgctgatgccgccggagcagctgcgcaacagctccttccacttcctgcgggagctcagccgcgtgctg cacaccaacgtggtcttcaagcgtgacgcacacggccagcagatgatcttccctactacggccgcgaggaggagctgcgcaagcaccccatcaagcgtgcc gccgagggctgggccgcacctgacgccctgctgggccaggtgaaggcctcgctgctccctggtggcagcgagggtggcggcggcggagggagctggaccc catggacgtccgcggctccatcgtctacctggagattgacaaccggcagtgtgtgcaggcctcctcgcagtgcttccagagtgccaccgacgtggccgcattcct gggagcgctcgcctcgctgggcagcctcaacatcccctacaagatcgaggccgtgcagagtgagaccgtggagccgccccgccggcgcagctgcacttcat gtacgtggcggcggccgcctttgtgcttctgttcttcgtgggctgcggggtgctgctgtcccgcaagcgccggcggcagcatggccagctctggttccct

Fig. 2b-3 gagggcttcaaagtgtctgaggccagcaagaagaagcggcgggagcccctcggcgaggactccgtgggcctcaagcccctgaagaacgcttcagacggtgc cctcatggacgacaaccagaatgagtgggggacgaggacctggagaccaagaagttccggttcgaggagcccgtggttctgcctgacctggacgaccaga cagaccaccggcagtggactcagcagcacctggatgccgctgacctgcgcatgtctgccatggccccacaccgccccagggtgaggttgacgccgactgca tggacgtcaatgtccgcgggcctgatggcttcaccccgctcatgatcgcctcctgcagcggggggcggcctggagacgggcaacagcgaggaagaggaggac gcgccggccgtcatctccgacttcatctaccagggcgccagcctgcacaaccagacagaccgcacgggcgagaccgccttgcacctggccgcccgctactca cgctctgatgccgccaagcgcctgctggaggccagcgcagatgccaacatccaggacaacatgggccgcaccccgctgcatgcggctgtgtctgccgacgca caaggtgtcttccagatcctgatccggaaccgagccacagacctggatgcccgcatgcatgatggcacgacgccactgatcctggctgcccgcctggccgtgg agggcatgctggaggacctcatcaactcacacgccgacgtcaacgccgtagatgacctgggcaagtccgccctgcactgggccgccgccgtgaacaatgtgg atgccgcagttgtgctcctgaagaacggggctaacaaagatatgcagaacaacagggaggagacacccctgtttctggccgcccgggagggcagctacgag accgccaaggtgctgctggaccactttgccaaccgggacatcacggatcatatggaccgcctgccgcgcgacatcgcacaggagcgcatgcatcacgacatc gtgaggctgctggacgagtacaaacctggtgcgcagcccgcagctgcacggagccccgctgggggcacgcccaccctgtcgccccgctctgctcgcccaac ggctacctgggcagcctcaagcccggcgtgcagggcaagaaggtccgcaagcccagcagcaaaggcctggcctgtggaagcaaggaggccaaggacctc aaggcacggaggaagaagtcccaggatggcaagggctgcctgctggacagctccggcatgctctcgcccgtggactccctggagtcaccccatggctacctgt cagacgtggcctcgccgccactgctgccctccccgttccagcagtctccgtccgtgcccctcaaccacctgcctgggatgcccgacacccacctgggcatcggg cacctgaacgtggcggccaagcccgagatggcggcgctggtggggcggccggctggcctttgagactggcccacctcgtctctcccacctgcctgtggcctc tggcaccagcaccgtcctgggctccagcagcggaggggccctgaatttcactgtgggcgggtccaccagtttgaatggtcaatgcgagtggctgtcccggctgc agagcggcatggtgccgaaccaatacaaccctctgcgggggagtgtggcaccaggcccctgagcacacaggccccctccctgcagcatggcatggtaggc (CONT.)

(Fig. 2b-3 CONTINUED)
ccgctgcacagtagccttgctgccagcgccctgtcccagatgatgagctaccagggcctgcccagcacccggctggccacccagcctcacctggtgcagaccc agcaggtgcagccacaaaacttacagatgcagcagcagaacctgcagccagcaaacatccagcagcagcaaagcctgcagccgccaccaccaccacca cagccgcaccttggcgtgagctcagcagccagcggccacctgggccggagcttcctgagtggagagccgagccaggcagacgtgcagccactgggcccca gcagcctggcggtgcacactattctgccccaggagagccccgccctgcccacgtcgctgccatcctcgctggtcccacccgtgaccgcagcccagttcctgacg cccccctcgcagcacagctactcctcgcctgtggacaacaccccagccaccagctacaggtgcctgagcacccttcctgaccccttcgccggagtcgcccg accaatggtcgtcctcgtcgccgcactctaatgtgtctgactggtctgagggcgtgtcgtcgcccccgacctccatgcagtcccagatcgcgcgcatcccggagg cgttcaagtaatagctcgaggtgccagcagctc

Fig. 2b-4

(GenBank : AAG33848.1)

MPPLLAPLLCLALLPALAARGPRCSQPGETCLNGGKCEAANGTEACVCGGAFVGPRCQDPNPCLSTPCKNAGTCH

VVDRRGVADYACSCALGFSGPLCLTPLDNACLTNPCRNGGTCDLLTLTEYKCRCPPGWSGKSCQQADPCASNPCA

NGGQCLPFEASYICHCPPSFHGPTCRQDVNECGQKPRLCRHGGTCHNEVGSYRCVCRATHTGPNCERPYVPCSP

SPCQNGGTCRPTGDVTHECACLPGFTGQNCEENIDDCPGNNCKNGGACVDGVNTYNCPCPPEWTGQYCTEDVD

ECQLMPNACQNGGTCHNTHGGYNCVCVNGWTGEDCSENIDDCASAACFHGATCHDRVASFYCECPHGRTGLLC

HLNDACISNPCNEGSNCDTNPVNGKAICTCPSGYTGPACSQDVDECSLGANPCEHAGKCINTLGSFECQCLQGYT

GPRCEIDVNECVSNPCQNDATCLDQIGEFQCMCMPGYEGVHCEVNTDECASSPCLHNGRCLDKINEFQCECPTGF

TGHLCQYDVDECASTPCKNGAKCLDGPNTYTCVCTEGYTGTHCEVDIDECDPDPCHYGSCKDGVATFTCLCRPGY

TGHHCETNINECSSQPCRLRGTCQDPDNAYLCFCLKGTTGPNCEINLDDCASSPCDSGTCLDKIDGYECACEPGYT

GSMCNSNIDECAGNPCHNGGTCEDGINGFTCRCPEGYHDPTCLSEVNECNSNPCVHGACRDSLNGYKCDCDPG

WSGTNCDINNNECESNPCVNGGTCKDMTSGIVCTCREGFSGPNCQTNINECASNPCLNKGTCIDDVAGYKCNCLL

PYTGATCEVVLAPCAPSPCRNGGECRQSEDYESFSCVCPTAGAKGQTCEVDINECVLSPCRHGASCQNTHGXYRC

HCQAGYSGRNCETDIDDCRPNPCHNGGSCTDGINTAFCDCLPGFRGTFCEEDINECASDPCRNGANCTDCVDSYT

CTCPAGFSGIHCENNTPDCTESSCFNGGTCVDGINSFTCLCPPGFTGSYCQHVVNECDSRPCLLGGTCQDGRGLH

RCTCPQGYTGPNCQNLVHWCDSSPCKNGGKCWQTHTQYRCECPSGWTGLYCDVPSVSCEVAAQRQGVDVARLC

QHGGLCVDAGNTHHCRCQAGYTGSYCEDLVDECSPSPCQNGATCTDYLGGYSCKCVAGYHGVNCSEEIDECLSHP (CONT.)

(Fig. 2b-4 CONTINUED)

CQNGGTCLDLPNTYKCSCPRGTQGVHCEINVDDCNPPVDPVSRSPKCFNNGTCVDQVGGYSCTCPPGFVGERCE

GDVNECLSNPCDARGTQNCVQRVNDFHCECRAGHTGRRCESVINGCKGKPCKNGGTCAVASNTARGFICKCPAG

FEGATCENDARTCGSLRCLNGGTCISGPRSPTCLCLGPFTGPECQFPASSPCLGGNPCYNQGTCEPTSESPFYRCL

CPAKFNGLLCHILDYSFGGGAGRDIPPPLIEEACELPECQEDAGNKVCSLQCNNHACGWDGGDCSLNFNDPWKN

CTQSLQCWKYFSDGHCDSQCNSAGCLFDGFDCQRAEGQCNPLYDQYCKDHFSDGHCDQGCNSAECEWDGLDC

AEHVPERLAAGTLVVVVLMPPEQLRNSSFHFLRELSRVLHTNVVFKRDAHGQQMIFPYYGREEELRKHPIKRAAEG

WAAPDALLGQVKASLLPGGSEGGRRRRELDPMDVRGSIVYLEIDNRQCVQASSQCFQSATDVAAFLGALASLGSLN

IPYKIEAVQSETVEPPPPAQLHFMYVAAAAFVLLFFVGCGVLLSRKRRRQHGQLWFPEGFKVSEASKKKRREPLGED

SVGLKPLKNASDGALMDDNQNEWGDEDLETKKFRFEEPVVLPDLDDQTDHRQWTQQHLDAADLRMSAMAPTP

PQGEVDADCMDVNVRGPDGFTPLMIASCSGGGLETGNSEEEEDAPAVISDFIYQGASLHNQTDRTGETALHLAAR

YSRSDAAKRLLEASADANIQDNMGRTPLHAAVSADAQGVFQILIRNRATDLDARMHDGTTPLILAARLAVEGMLED

LINSHADVNAVDDLGKSALHWAAAVNNVDAAVVLLKNGANKDMQNNREETPLFLAAREGSYETAKVLLDHFANR

DITDHMDRLPRDIAQERMHHDIVRLLDEYNLVRSPQLHGAPLGGTPTLSPPLCSPNGYLGSLKPGVQGKKVRKPS

SKGLACGSKEAKDLKARRKKSQDGKGCLLDSSGMLSPVDSLESPHGYLSDVASPPLLPSPFQQSPSVPLNHLPG

MPDTHLGIGHLNVAAKPEMAALGGGGRLAFETGPPRLSHLPVASGTSTVLGSSSGGALNFTVGGSTSLNGQCEWL

SRLQSGMVPNQYNPLRGSVAPGPLSTQAPSLQHGMVGPLHSSLAASALSQMMSYQGLPSTRLATQPHLVQTQQV

QPQNLQMQQQNLQPANIQQQQSLQPPPPPPQPHLGVSSAASGHLGRSFLSGEPSQADVQPLGPSSLAVHTILPQE

SPALPTSLPSSLVPPVTAAQFLTPPSQHSYSSPVDNTPSHQLQVPEHPFLTPSPESPDQWSSSSPHSNVSDWSEGV

SSPPTSMQSQIARIPEAFK

Fig. 2c

HIF-3α4

(GenBank: AB118749.1)

gactggcgagccatggcgctggggctgcagcgcgcaaggtcgaccacggagctgcgcaaggaaaagtcccgggatgcggcccgcagccggcgcagccag gagaccgaggtgctgtaccagctggctcacacgctgcccttcgcccgcggcgtcagcgcccacctggacaaggcctctatcatgcgcctcaccatcagctacct gcgcatgcaccgcctctgcgccgcaggggagtggaaccaggtgggagcagggggagaaccacggatgcctgctacctgaaggccctggagggcttcgtcat ggtgctcaccgccgagggagacatggcttacctgtcggagaatgtcagcaaacacctgggcctcagtcagctggagctcattggacacagcatctttgatttcat ccacccctgtgaccaagaggagcttcaggacgccctgaccccccagcagaccctgtccaggaggaaggtggaggcccccacggagcggtgcttctccttgcg catgaagagtacgctcaccagccgcgggcgcaccctcaacctcaaggcggccacctggaaggtgctgaactgctctggacatatgagggcctacaagccac ctgcgcagactctccagctgggagccctgactcagagccccgctgcagtgcctggtgctcatctgcgaagccatcccccacccaggcagcctggagccccc actgggccgaggggccttcctcagccgccacagcctggacatgaagttcacctactgtgacgacaggattgcagaagtggctggctatagtcccgatgacctga tcggctgttccgcctacgagtacatccacgcgctggactccgacgcggtcagcaagagcatccacacctgtatgtatcccatttccccaggtgcgaagccagctg ccacatggccccagctgacaccaggaccccccagctccccataccccaggatgcactgcctcccacctcaacaccagctccctgctccccaagcccaag gaactgtctccttccttgccccctcatacccagtccccagatctttctctccccatttgccccccttggtggccctgatc (GenBank: BAD93355.1)

MALGLQRARSTTELRKEKSRDAARSRRSQETEVLYQLAHTLPFARGVSAHLDKASIMRLTISYLRMHRLCAAGEWN

QVGAGGEPLDACYLKALEGFVMVLTAEGDMAYLSENVSKHLGLSQLELIGHSIFDFIHPCDQEELQDALTPQQTLSR

RKVEAPTERCFSLRMKSTLTSRGRTLNLKAATWKVLNCSGHMRAYKPPAQTSPAGSPDSEPPLQCLVLICEAIPHP

GSLEPPLGRGAFLSRHSLDMKFTYCDDRIAEVAGYSPDDLIGCSAYEYIHALDSDAVSKSIHTCMYPISPGAKPAAT

WPPADTRTPQLPIPQDALPPHLNTSSLLPKPQGTVSFLAPSYPVPRSFSPHLPPWWP

Figure. 3. Comparison of HIF-3α4, SOCS3 and p53 gene expression levels after each recombinant adenovirus infection.

HIF-3α4 (a), SOCS3 (b) and p53 (c) mRNA levels were determined by using real-time qPCR. Each mRNA levels are standardized by the expression levels of control gene TBP. (n=3, average ±SD bars, **p< 0.01).

Figure. 4. Comparison of Survivin and CCL2 gene expression levels after each recombinant adenovirus infection.

Survivin (a) and CCL2 (b) mRNA levels were determined by using real-time qPCR. Each mRNA levels are standardized by the expression levels of control gene TBP. (n=3, average ±SD bars, **p< 0.01).

Figure. 5. Comparison of VEGF, Cyclin-G2 and Bcl-xL gene expression levels after each recombinant adenovirus infection.

VEGF (a), Cyclin-G2 (b) and Bcl-xL (c) mRNA levels were determined by using real-time qPCR. Each mRNA levels are standardized by the expression levels of control gene TBP. (n=3, average ± SD bars, *p< 0.05, **p< 0.01).

Figure. 6. Comparison of tumor mean volume in vivo.

For in vivo study, $1 \times 10^6$ of MDA-MB-231, human breast cancer cells were subcutaneously inoculated into BALB/c-nu mice. Tumor bearing mice were randomly assigned into 5 treatment groups (n=5) as follows; ADX730, rAd-SOCS3, rAd-p53, rAd-LacZ, and PBS. Intratumoral administrations were performed with $1 \times 10^9$ PFU of each (CONT.)

(Fig. 6 CONTINUED)
virus in 50 μL PBS every other day from 14 days post tumor inoculation. (n=5, average ±SE bars, *p< 0.05, **p< 0.01)

CANCER GENE THERAPY DRUG

CROSS REFERENCE TO PRIOR APPLICATION

This application is a National Stage patent application of PCT International Patent Application No. PCT/JP2020/046891 (filed on Dec. 16, 2020) under 35 U.S.C. § 371, which claims priority to Japanese Patent Application No. 2019-239677 (filed on Dec. 27, 2019).

TECHNICAL FIELD

The present disclosure relates to, for example, a novel cancer gene therapy drug or method, and an active ingredient thereof. The contents of all of the documents described in the present specification (including NPL 1 to NPL 12 cited below as prior art documents) are incorporated herein by reference.

BACKGROUND ART

In recent years, gene therapy using viral vectors has attracted attention as a new treatment for cancer. This makes use of the characteristics of various viruses and uses viruses as gene "carriers," i.e., viral vectors. One of the methods of gene transfer is in vivo gene therapy, in which a recombinant viral vector incorporated with a therapeutic gene is administered directly into the body to treat the disease. Cancer gene therapy differs from existing therapies, such as chemotherapy, in its mechanism of action; genes are introduced into cancer cells to directly inhibit genes involved in cancer development and growth, or cancer-suppressor genes are introduced into cells to directly induce cell death. Therefore, cancer gene therapy is expected to be effective for cancers that are difficult to treat with existing chemotherapy and radiotherapy.

CITATION LIST

Non-Patent Literature

NPL 1: Kosaki R., Watanabe K., Yamaguchi Y. (1999). Overproduction of hyaluronan by expression of the hyaluronan synthase Has2 enhances anchorage-independent growth and tumorigenicity. Cancer Res. 1999 Mar. 1; 59(5):1141-5.

NPL 2: Bourguignon L. Y., Zhu H., Shao L., Chen Y. W. (2001). CD44 interaction with c-Src kinase promotes cortactin-mediated cytoskeleton function and hyaluronic acid-dependent ovarian tumor cell migration. J Biol Chem. 2001 Mar. 9; 276(10):7327-36. Epub 2000 Nov. 17.

NPL 3: Fujita Y., Kitagawa M., Nakamura S., Azuma K., Ishii G., Higashi M., Kishi H., Hiwasa T., Koda K., Nakajima N., Harigaya K. (2002). CD44 signaling through focal adhesion kinase and its anti-apoptotic effect. FEBS Lett. 2002 Sep. 25; 528(1-3):101-8.

NPL 4: Bazil V., Horejsi V. (1992). Shedding of the CD44 adhesion molecule from leukocytes induced by anti-CD44 monoclonal antibody simulating the effect of a natural receptor ligand. J Immunol. 1992 Aug. 1; 149(3): 747-53.

NPL 5: Murakami D., Okamoto I., Nagano O., Kawano Y., Tomita T., Iwatsubo T., De Strooper B., Yumoto E., Saya H. (2003). Presenilin-dependent gamma-secretase activity mediates the intramembranous cleavage of CD44. Oncogene. 2003 Mar. 13; 22(10):1511-6.

NPL 6: Ueda M., Saji H. (2014). Radiolabeled Probes Targeting Hypoxia-Inducible Factor-1-Active Tumor Microenvironments. Scientific World Journal. 2014; 2014:165461. doi: 10.1155/2014/165461. Epub 2014 Aug. 18.

NPL 7: Gao N., Shen L., Zhang Z., Leonard S. S., He H., Zhang X. G., Shi X., Jiang B. H. (2004). Arsenite induces HIF-1alpha and VEGF through PI3K, Akt and reactive oxygen species in DU145 human prostate carcinoma cells. Mol Cell Biochem. 2004 January; 255(1-2):33-45.

NPL 8: Kopan R., Ilagan M X. (2009). The canonical Notch signaling pathway: unfolding the activation mechanism. Cell. 2009 Apr. 17; 137(2):216-33. doi: 10.1016/j.cell.2009.03.045.

NPL 9: Shona, T., Graeme, J. (2009). A Cancer Gene Therapy Approach that Targets Tumor-associated Hyaluronan. Cancer Growth and Metastasis 2009 (2) November 2009 with 31 Reads.

NPL 10: Morsut L., Roybal K. T., Xiong X., Gordley R. M., Coyle S. M., Thomson M., Lim W. A. (2016). Engineering Customized Cell Sensing and Response Behaviors Using Synthetic Notch Receptors. Cell. 2016 Feb. 11; 164(4): 780-91. doi: 10.1016/j.cell.2016.01.012. Epub 2016 Jan. 28.

NPL 11: Makino Y., Cao R., Svensson K., Bertilsson G., Asman M., Tanaka H., Cao Y., Berkenstam A., Poellinger L. (2001). Inhibitory PAS domain protein is a negative regulator of hypoxia-inducible gene expression. Nature. 2001 Nov. 29; 414(6863):550-4.

NPL 12: Maynard M. A., Evans A. J., Hosomi T., Hara S., Jewett M. A., Ohh M. (2005). Human HIF-3alpha4 is a dominant-negative regulator of HIF-1 and is down-regulated in renal cell carcinoma. FASEB J. 2005 September; 19(11):1396-406.

SUMMARY OF INVENTION

Technical Problem

The present inventors conducted research with the main object of providing a novel cancer gene therapy drug or method.

Solution to Problem

Viral vectors carrying externally introduced genes are important for the expression of the genes in cancer cells. Examples of viral vectors include retroviruses, lentiviruses, Sendai virus, and the like.

However, since the size of genes that can be inserted into viral vectors is limited, the design currently required is such that a gene is inserted in an acceptable size to achieve its effect. The cancer-suppressive effect obtained is limited to the function of the inserted gene, and it is thus necessary to find a way to suppress the size of the gene inserted into the viral vector within an acceptable range and to achieve its effect more efficiently. In other words, the key point for improving the efficacy of cancer gene therapy drugs using viral vectors is how to efficiently create genes having cancer-suppressive effects within a limited size.

For this reason, various gene modifications and combinations were investigated, and attempts were made to create artificial genes having particularly high cancer-suppressive effects. As a result, it was found that artificial genes fused with CD44 (in particular, the extracellular part), Notch (in particular, the core region), and HIF-3α4 had very high cancer-suppressive effects. The present inventors have made further improvements based on this finding.

The present disclosure includes, for example, the main subjects described in the following items.

Item 1.

A nucleic acid having a structure in which (A) a nucleic acid encoding a protein having a CD44 extracellular function, (B) a nucleic acid encoding a protein having a Notch core region function, and (C) a nucleic acid encoding a protein having an HIF-3α4 function are linked in the order of (A)-(B)-(C).

Item 2.

A nucleic acid having a structure in which nucleic acid (A), nucleic acid (B), and nucleic acid (C) are linked in the order of (A)-(B)-(C);
  nucleic acid (A) being:
  (a-1): a nucleic acid consisting of the base sequence of SEQ ID NO: 1, or
  (a-2): a nucleic acid consisting of a base sequence having deletion, substitution, or addition of one or more bases in the base sequence of (a-1), and encoding a protein that can bind to hyaluronic acid;
  nucleic acid (B) being:
  (b-1): a nucleic acid consisting of the base sequence of SEQ ID NO: 2, or
  (b-2): a nucleic acid consisting of a base sequence having deletion, substitution, or addition of one or more bases in the base sequence of (b-1), and encoding a protein that can be cleaved by a protease; and
  nucleic acid (C) being:
  (c-1): a nucleic acid consisting of the base sequence of SEQ ID NO: 3, or
  (c-2): a nucleic acid consisting of a base sequence having deletion, substitution, or addition of one or more bases in the base sequence of (c-1), and encoding a protein that can bind to HIF-1α.

Item 3.

The nucleic acid according to Item 1, wherein nucleic acid (A) is:
  (a-1): a nucleic acid consisting of the base sequence of SEQ ID NO: 1, or
  (a-2): a nucleic acid consisting of a base sequence having deletion, substitution, or addition of one or more bases in the base sequence of (a-1), and encoding a protein that can bind to hyaluronic acid;
  nucleic acid (B) is:
  (b-1): a nucleic acid consisting of the base sequence of SEQ ID NO: 2, or
  (b-2): a nucleic acid consisting of a base sequence having deletion, substitution, or addition of one or more bases in the base sequence of (b-1), and encoding a protein that can be cleaved by a protease in a protein encoded by the nucleic acid having a structure in which (A), (B), and (C) are linked in this order, and
  nucleic acid (C) is:
  (c-1): a nucleic acid consisting of the base sequence of SEQ ID NO: 3, or
  (c-2): a nucleic acid consisting of a base sequence having deletion, substitution, or addition of one or more bases in the base sequence of (c-1), and encoding a protein that can bind to HIF-1α.

Item 4.

A nucleic acid that is:
  (d-1) a nucleic acid consisting of the base sequence of SEQ ID NO: 4;
  (d-2) a nucleic acid consisting of a base sequence having deletion, substitution, or addition of one or more bases in the base sequence of SEQ ID NO: 4, and having a structure in which a portion encoding a protein that can bind to hyaluronic acid, a portion encoding a protein that can be cleaved by a protease, and a portion encoding a protein that can bind to HIF-1α are linked in this order; or
  (d-3) a nucleic acid consisting of a base sequence having deletion, substitution, or addition of one or more bases in the base sequence of SEQ ID NO: 4, and encoding a protein having anti-cancer activity.

Item 5.

The nucleic acid according to any one of Items 1 to 4, wherein the protease is ADAM protease or γ-secretase.

Item 6.

A protein encoded by the nucleic acid according to any one of Items 1 to 5.

Item 7.

A vector into which the nucleic acid according to any one of Items 1 to 5 is introduced in an expressible manner.

Item 8.

The vector according to Item 7, wherein the vector is an adenoviral vector.

Item 9.

An anti-cancer composition comprising the nucleic acid according to any one of Items 1 to 5 or the vector according to Item 7 or 8.

Item 10.

The anti-cancer composition according to Item 9, which is an injection.

Item 11.

The anti-cancer composition according to Item 9 or 10, for use in treatment of breast cancer, prostate cancer, stomach cancer, or pancreatic cancer.

Item 12.

The anti-cancer composition according to Item 9 or 10, for use in treatment of triple-negative breast cancer.

Advantageous Effects of Invention

It is possible to provide a novel cancer gene therapy drug with a very high anti-cancer effect. This gene therapy drug can be effective even for types of cancer for which existing cancer therapy drugs are not effective, and can be preferably used, for example, for triple-negative (estrogen receptor-negative, progesterone receptor-negative, and HER2-negative) breast cancer.

BRIEF DESCRIPTION OF DRAWINGS

FIG. 1 shows the sequence of the produced CD44/Notch/HIF-3α4 fusion gene.

FIG. 2a shows the base sequence and amino acid sequence of human CD44. The underlined parts were used in the production of the CD44/Notch/HIF-3α4 fusion gene.

FIG. 2b-1 shows the base sequence of Notch.

FIG. 2b-2 shows the (continued) base sequence of Notch. The underlined part was used in the production of the CD44/Notch/HIF-3α4 fusion gene.

FIG. 2b-3 shows the (continued) base sequence of Notch.

FIG. 2b-4 shows the amino acid sequence of Notch. The underlined part was used in the production of the CD44/Notch/HIF-3α4 fusion gene.

FIG. 2c shows the base sequence and amino acid sequence of human HIF-3α4. The underlined part was used in the production of the CD44/Notch/HIF-3α4 fusion gene.

FIG. 3 shows the results of infecting cells in vitro with genetically modified adenoviral vectors, and evaluating whether the introduction of each gene was successful by a real-time PCR test.

FIG. 4 shows the results of infecting cells in vitro with genetically modified adenoviral vectors, including ADX730 (a genetically modified adenoviral vector incorporated with the CD44/Notch/HIF-3α4 fusion gene), and comparing and examining, by a real-time PCR test, whether the expression of Survivin and CCL2 genes, which are CD44 downstream genes, were suppressed by the decoy function of the CD44 decoy receptor of ADX730.

FIG. 7 shows a photograph of the excised tumors (n=5) when intratumorally administering (injecting) genetically modified adenoviral vectors, including ADX730, or PBS to nude mice implanted with MDA-MB-231 human triple-negative breast cancer cells according to the administration schedule shown in the upper side of FIG. 6.

FIG. 8a shows the results of infecting cells in vitro with a genetically modified adenoviral vector, and evaluating whether the introduction of the CD44/Notch/HIF-3α4 fusion gene was successful by a real-time PCR test using DU-145 cells.

FIG. 8b shows the results of infecting cells in vitro with a genetically modified adenoviral vector, and evaluating whether the introduction of the CD44/Notch/HIF-3α4 fusion gene was successful by a real-time PCR test using MKN45 cells.

FIG. 8c shows the results of infecting cells in vitro with a genetically modified adenoviral vector, and evaluating whether the introduction of the CD44/Notch/HIF-3α4 fusion gene was successful by a real-time PCR test using PANC-1 cells.

DESCRIPTION OF EMBODIMENTS

Figure 3:
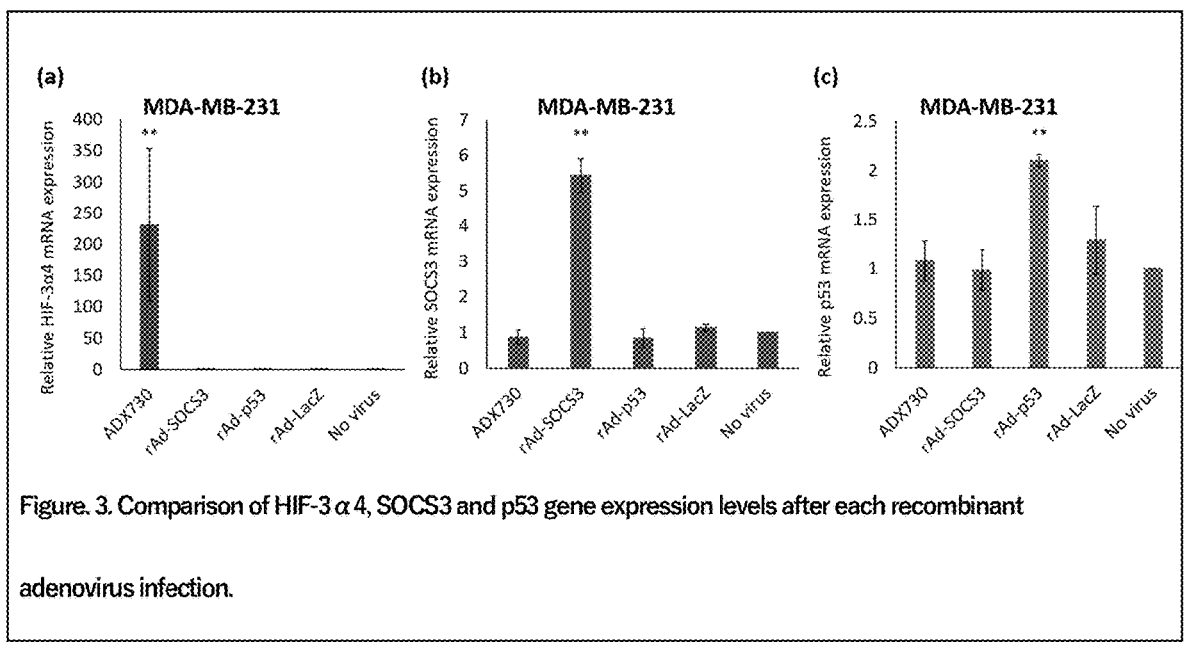

Embodiments included in the present disclosure are described in more detail below. The present disclosure preferably includes, for example, a specific artificial nucleic acid, a viral vector incorporated with the artificial nucleic acid, an anti-cancer composition comprising the viral vector, and a method for treating cancer using the composition, but is not limited thereto. The present disclosure includes everything disclosed in the present specification and recognizable by a person skilled in the art.

The artificial nucleic acid included in the present disclosure is preferably a nucleic acid having a structure in which (A) a nucleic acid encoding a protein having a CD44 extracellular function, (B) a nucleic acid encoding a protein having a Notch core region function, and (C) a nucleic acid encoding a protein having an HIF-3α4 function are linked in the order of (A)-(B)-(C). This nucleic acid is also referred to as "the nucleic acid of the present disclosure." In the present disclosure, the nucleic acid can be DNA, RNA, PNA, or the like, but is particularly preferably DNA. Further, in the nucleic acid having a structure in which (A), (B), and (C) are linked in this order, the (A) side may be the 3'-terminal or 5'-terminal, but is preferably the 5'-terminal.

CD44 is a receptor for hyaluronic acid etc., and binds to a ligand (e.g., hyaluronic acid) to cluster and transmit signals. This is known to cause intracellular phenomena, including activation of various kinases involved in cell proliferation and cell migration, such as c-Src, FAK, and MAPK. It is also known that after signal transmission, the intracellular domain translocates to the nucleus upon cleavage by a protease, and that the cleaved extracellular domain is released as soluble CD44. Due to such properties, CD44 is highly expressed in many types of cancer cells, such as colon cancer, breast cancer, stomach cancer, pancreatic cancer, and prostate cancer, and has been studied as a marker for cancer stem cells.

In the present disclosure, the CD44 extracellular function refers to a receptor function for ligands, and this function preferably includes, for example, hyaluronic acid-binding ability.

Therefore, the protein having a CD44 extracellular function may be, for example, a protein of the entire extracellular portion of CD44, or as long as the receptor function for ligands is not impaired, may contain a cell membrane portion of CD44 or may be a protein of part of the extracellular portion of CD44. Further, as long as this function is maintained, one or more amino acids may be deleted, substituted, or added in such a protein. Nucleic acid (A) is not particularly limited as long as it is a nucleic acid encoding such a polypeptide.

More specifically, nucleic acid (A) is preferably, for example, the following nucleic acid (a-1) or (a-2).
(a-1): a nucleic acid consisting of the base sequence of SEQ ID NO: 1; or
(a-2): a nucleic acid consisting of a base sequence having deletion, substitution, or addition of one or more (e.g., 1 to 30, 1 to 20, 1 to 10, or 1, 2, 3, 4, or 5) bases in the base sequence of (a-1), and encoding a protein that can bind to hyaluronic acid.

Whether the protein can bind to hyaluronic acid can be determined, for example, by determining its dissociation constant.

Notch is a receptor expressed on the surface of cells, and the Notch signaling system is one of the main signaling systems responsible for intercellular signaling. In many cases, the mechanism of intercellular signaling is such that the signaling cell produces and releases a soluble ligand, which binds to the receptor on the cell surface of the receiving cell. Further, intracellular signaling pathways, including downstream phosphorylation cascades, are activated on the receiving cell side, and the activity of specific transcription factors changes to regulate gene expression. On the other hand, the Notch signaling system is characterized by signaling through direct interaction between adjacent cells. Notch, which acts as a receptor, binds to the ligand Delta or Serrate (Jagged in mammals) on the cell surface and further undergoes a conformational change due to the application of physical force, which causes the separation of the intracellular domain of Notch due to the action of a protein-cleaving enzyme (protease) such as ADAM protease or γ-secretase. The intracellular domain of Notch released from the cell membrane in this way translocates to the nucleus and regulates its transcription by interacting with transcription factors and coactivators upstream of the target gene.

In the present disclosure, the Notch core region is a region containing the site cleaved by the action of a protease, and the Notch core region function is a function of being cleavable (preferably being separable to a limited extent) by a protease that can cleave the Notch core region.

Therefore, the protein having a Notch core region function may be, for example, a protein containing only a portion of the Notch core region necessary for protease cleavage, or as long as it is cleaved by the action of a protease, may be a protein containing, together with the portion necessary for protease cleavage, one or more (e.g., 1 to 30, 1 to 20, 1 to 10, or 1, 2, 3, 4, or 5) amino acids in front of and behind the portion necessary for protease cleavage. Furthermore, as long as it is cleaved by the action of a protease, one or more (e.g., 1 to 30, 1 to 20, 1 to 10, or 1, 2, 3, 4, or 5) amino acids may be deleted, substituted, or added in such a protein. Nucleic acid (B) is not particularly limited as long as it is a nucleic acid encoding such a protein.

More specifically, nucleic acid (B) is preferably, for example, the following nucleic acid (b-1) or (b-2).
- (b-1): a nucleic acid consisting of the base sequence of SEQ ID NO: 2; or
- (b-2): a nucleic acid consisting of a base sequence having deletion, substitution, or addition of one or more bases in the base sequence of (b-1), and encoding a protein that can be cleaved by a protease.

Preferred examples of proteases include ADAM protease and γ-secretase, as described above. It is more preferable to encode a polypeptide that is cleaved by either or both of these proteases. ADAM protease is a proteolytic enzyme belonging to a group called "a disintegrin and metalloproteinase family."

Whether the protein can be cleaved by a protease can be confirmed by treating the protein with the protease, followed by electrophoresis (e.g., SDS-PAGE).

Further, it is more preferable that (b-2) is (b-2'): a nucleic acid consisting of a base sequence having deletion, substitution, or addition of one or more bases in the base sequence of (b-1), and encoding a protein encoded by the nucleic acid having a structure in which (A), (B), and (C) are linked in this order, wherein the protein can be cleaved by an intracellular protease when a ligand binds to the protein encoded by nucleic acid (A).

HIF (hypoxia inducible factor) is a transcription factor that is activated when intracellular hypoxia occurs, and is a heterodimer composed of HIF-1α and HIF-1β. It has been clarified that HIF-1a is inhibited not only by PHD degradation under normal oxygen concentration, but also by a transcription factor called "IPAS" (inhibitory PAS domain protein), which was found in mice. IPAS was identified as a splicing variant of HIF-3α, one of the HIFs. Although IPAS does not have transcriptional activity per se, its interaction with HIF-1α inhibits binding to DNA and suppresses the function of HIF-1α. In humans, HIF-3α4, identified as a splicing variant of HIF-3α, has been shown to function as IPAS does.

Accordingly, in the present disclosure, the HIF-3α4 function is a function that can inhibit HIF-1α, and more specifically a function that interacts with (binds to) HIF-1α.

Therefore, the protein having an HIF-3α4 function may be, for example, HIF-3α4 itself, or as long as it can inhibit HIF-1α, may be a protein in which one or more (e.g., 1 to 30, 1 to 20, 1 to 10, or 1, 2, 3, 4, or 5) amino acids are further added to HIF-3α4. Furthermore, as long as it can inhibit HIF-1α, one or more (e.g., 1 to 30, 1 to 20, 1 to 10, or 1, 2, 3, 4, or 5) amino acids may be deleted, substituted, or added in such a protein. Nucleic acid (C) is not particularly limited as long as it is a nucleic acid encoding such a protein.

More specifically, nucleic acid (C) is preferably, for example, the following nucleic acid (c-1) or (c-2).
- (c-1): a nucleic acid consisting of the base sequence of SEQ ID NO: 3; or
- (c-2): a nucleic acid consisting of a base sequence having deletion, substitution, or addition of one or more bases in the base sequence of (c-1), and encoding a protein that can bind to HIF-1α.

Whether the protein can bind to HIF-1α can be examined by co-immunoprecipitation using the target protein, HIF-1α, and an antibody that recognizes them.

In the linkage of nucleic acids (A), (B), and (C), these nucleic acids may be directly linked, or each nucleic acid may be linked through a linker. The linker is not particularly limited as long as the effects of the nucleic acid of the present disclosure are not impaired; however, it is preferably, for example, a nucleic acid consisting of one or more bases.

The base length of the nucleic acid of the present disclosure (the nucleic acid having a structure in which (A), (B), and (C) are linked in this order) is, for example, preferably 8000 bp or less, and more preferably 7500, 7000, 6500, 6000, 5500, 5000, 4500, 4000, 3500, or 3000 bp or less.

Further, a preferred embodiment of the nucleic acid of the present disclosure is (d-1): a nucleic acid consisting of the base sequence of SEQ ID NO: 4. Another preferred embodiment of the nucleic acid of the present disclosure is (d-2): a nucleic acid consisting of a base sequence having deletion, substitution, or addition of one or more bases in the base sequence of SEQ ID NO: 4, and including a portion encoding a protein that can bind to hyaluronic acid, a portion encoding a protein that can be cleaved by a protease, and a portion encoding a protein that can bind to HIF-1α, which are linked in this order. Still another embodiment is (d-3): a nucleic acid consisting of a base sequence having deletion, substitution, or addition of one or more bases in the base sequence of SEQ ID NO: 4, and encoding a protein having anti-cancer activity. Whether the protein encoded by the nucleic acid has anti-cancer activity can be examined by introducing the nucleic acid into an adenoviral vector in an expressible manner, and administering it to cancer cells.

The number of bases deleted, substituted, or added in (a-2), (b-2), (b-2'), (c-2), (d-2), or (d-3), or the number of bases constituting the linker can be, for example, preferably 1 to 100 (1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100). Further, the type of base in the present disclosure is not particularly limited, but is preferably A (adenine), T (thymine), G (guanine), C (cytosine), or U (uracil).

The nucleic acid of the present disclosure can be produced by a known method or a method easily conceivable from a known method. For example, the nucleic acid of the present disclosure can be produced by a genetic engineering method. For example, the nucleic acid of the present disclosure may be produced by extracting DNA or RNA encoding CD44, Notch, and HIF-3α4 from a human-derived sample, and linking them after artificial mutation, if necessary, or may be produced by chemical synthesis.

Although not wishing to be bound by any theory, the anti-cancer effect of the protein encoded by the nucleic acid of the present disclosure is considered to be due to the following mechanism of action. The fusion protein encoded by the nucleic acid of the present disclosure includes (i) a protein portion having a CD44 extracellular function, (ii) a protein portion having a Notch core region function, and (iii) a protein portion having an HIF-3α4 function. Accordingly, portion (i) can function as a decoy receptor to transmit signals to portion (iii) via portion (ii). This becomes more effective when portion (i) is fused upstream of portion (ii). HIF-1α activated by the tumor can be inhibited by fusing portion (iii) downstream of portion (ii). As a result, it is considered that the genes inserted into the viral vector can be reduced within an acceptable range, and that an antitumor effect composed of a plurality of mechanisms of action can be exerted.

The vector into which the nucleic acid of the present disclosure is introduced in an expressible manner is useful for cancer treatment or for increasing the production of the nucleic acid of the present disclosure. Examples of the vector include plasmid vectors, cosmid vectors, fosmid vectors, viral vectors, and the like. When the nucleic acid of the present disclosure is used for cancer treatment, viral vectors are particularly preferred. Examples of viral vectors include adenoviral vectors, retroviral vectors, lentiviral vectors, Sendai virus vectors, and the like. Of these, adenoviral vectors are preferred. Proliferative viral vectors and non-proliferative viral vectors can both be used. In particular, proliferative or non-proliferative adenoviral vectors are preferred. The nucleic acid of the present disclosure can be introduced into a vector by a known method or a method easily conceivable from a known method.

The anti-cancer composition comprising a vector into which the nucleic acid of the present disclosure is introduced in an expressible manner has a very excellent anti-cancer effect (in particular, cancer treatment effect). The administration form of the anti-cancer composition is not particularly limited as long as the anti-cancer effect is exhibited. For example, intratumoral administration is generally preferable; however, intravenous administration may also be used depending on the vector. The dosage form of the anti-cancer composition is also not particularly limited as long as the anti-cancer effect is exhibited. For example, an injection is preferred.

The anti-cancer composition may appropriately contain components other than the above vectors, if necessary. Examples of such other components include pharmaceutically acceptable carriers (e.g., water). A suitable carrier can be selected and used depending on the treatment site and the dosage form of the anti-cancer composition.

Such an anti-cancer composition can also be prepared based on a known method.

The type of cancer to be treated with the anti-cancer composition is also not particularly limited as long as the anti-cancer effect is exhibited. Examples include solid tumors and blood tumors. More specific examples include, but are not particularly limited to, brain tumor, maxillary cancer, nasopharyngeal cancer, lung cancer, esophageal cancer, rectal cancer, colon cancer, liver cancer, stomach cancer, gallbladder cancer, pancreatic cancer, skin cancer, breast cancer, uterine cancer, ovarian cancer, prostate cancer, kidney cancer, bladder cancer, thyroid cancer, multiple myeloma, lymphoma, acute myelogenous leukemia, chronic myelogenous leukemia, and the like. The anti-cancer composition is particularly effective for breast cancer, prostate cancer, stomach cancer, pancreatic cancer, etc. Since the anti-cancer effect of the anti-cancer composition is very high, it can be used for types of cancer for which existing cancer therapeutic drugs are not effective or for small types of cancer, which is preferable. For example, the anti-cancer composition can be preferably used for triple-negative (estrogen receptor-negative, progesterone receptor-negative, and HER2-negative) breast cancer. The type of anti-cancer effect of the anti-cancer composition is also not particularly limited. For example, an effect capable of inhibiting the proliferation and/or infiltration of a tumor is preferred.

In the present specification, the term "comprising" includes "consisting essentially of" and "consisting of." Further, the present disclosure includes all of any combinations of the constituent requirements described in the present specification.

In addition, the various characteristics (properties, structures, functions, etc.) described in each embodiment of the present disclosure described above may be combined in any way in specifying the main subjects included in the present disclosure. In other words, the present disclosure includes all the main subjects comprising all combinations of the combinable characteristics described in the present specification.

EXAMPLES

Embodiments of the present disclosure are described in more detail below while providing examples; however, the embodiments of the present disclosure are not limited to the following examples.

Experimental Method

Construction of Insert DNA (CD44/Notch/HIF-3α4 Fusion Gene)

A nucleic acid having a structure in which (A) a nucleic acid encoding a protein having a CD44 extracellular function, (B) a nucleic acid encoding a protein having a Notch core region function, and (C) a nucleic acid encoding a protein having an HIF-3α4 function were linked in the order of (A)-(B)-(C) was produced in the following manner. A preferred embodiment of the nucleic acid actually produced in this Example is also referred to as a "CD44/Notch/HIF-3α4 fusion gene."

The production of the CD44/Notch/HIF-3α4 fusion gene was outsourced to GENEWIZ Solid Science. Superior Service. These three types of human genes were each subjected to restriction enzyme treatment with SwaI (TaKaRa, Siga, Japan), electrophoresis, and purification to obtain insert DNA for use. Each domain of the fusion gene was designed with reference to known documents (in particular, NPL 9, NPL 10, and NPL 12 mentioned above), transmembrane domain search tool TMHMM (http://www.cbs.dtu.dk/services/TMHMM/), and signal peptide sequence search tool SignalP (http://www.cbs.dtu.dk/services/SignalP/). FIG. 1 shows the sequence of the produced CD44/Notch/HIF-3α4 fusion gene. FIGS. 2a to 2c show the base sequences of the three types of human genes used (CD44, Notch, and HIF-3α4).

Production of Vector DNA

As a vector DNA for incorporating the insert DNA, pAxCAwtit2 cosmid vector included in an Adenovirus Dual Expression Kit (TaKaRa, Siga, Japan) was used. As with the insert DNA, the SwaI sequence at the cloning site of the cosmid vector was cleaved by restriction enzyme treatment and purified by phenol-chloroform extraction.

Production of Recombinant Cosmid Vector and Transformational Introduction into E. coli In order to link the insert DNA produced above and the pAxCAwtit2 cosmid vector, a ligation reaction (16° C., 30 minutes) was performed using a ligation mix (TaKaRa, Siga, Japan). After the reaction, the reaction solution was transformed into *E. coli* HST08 Premium Competent Cells (TaKaRa, Siga, Japan) by a method according to the manual of the kit. The transformed *E. coli* HST08 Premium Competent Cells were seeded on LB agar medium (Nacalai Tesque, Kyoto, Japan) supplemented with 100 μg/ml ampicillin, and cultured at 37° C. overnight. After the culture, the colonies grown on the LB agar medium were used as templates for insert check PCR using KOD FX Neo (Toyobo Co., Ltd., Osaka, Japan), and it was confirmed by agarose gel electrophoresis whether the transformation was successful. After confirmation, suitable colonies were subcultured in LB liquid medium (Nacalai Tesque, Kyoto, Japan) supplemented with 100 μg/ml ampicillin, and the cosmid vector was extracted from the culture at a later date by using the Genopure Plasmid Maxi Kit (Roche). Because the size of the extracted cosmid vector exceeded 40 kbp, restriction enzyme treatment with NruI (New England BioLabs) and ligation were further performed, thereby almost deleting the adeno virus genome to reduce the size of the cosmid, and the sequence was confirmed by DNA sequence analysis using the similarly extracted reduced cosmid vector.

Production of Recombinant Adenoviral Vector by Restriction Enzyme Treatment and Phenol-Chloroform Extraction The recombinant cosmid vector DNA, which was produced and confirmed for its sequence as described above, was subjected to restriction enzyme treatment using BspT104I (TaKaRa, Siga, Japan). After the restriction enzyme treatment, purification was performed by phenol-chloroform extraction and ethanol precipitation, and the resultant was dissolved in 30 μl of sterile purified water. 1 μl of the resulting solution was used for agarose gel electrophoresis, and digestion with the restriction enzyme BspT104I was confirmed. After confirmation, HEK293 cells (National Institutes of Biomedical Innovation, Health and Nutrition) cultured to confluence in a 60-mm cell culture Petri dish (TPP) were subjected to lipofection with Lipofectamine LTX (Invitrogen, Waltham, MA) using 10 μg of the BspT104I-digested cosmid. Then, the cultured cells were collected and seeded in a Biocoat Collagen I Cellware 96-well plate (Corning, NY, USA). 5 days and 10 days after seeding, 50 μl of Dulbecco's modified Eagle's medium (D-MEM; FUJIFILM Wako Pure Chemical Corporation, Osaka, Japan) containing 10% fetal bovine serum (FBS; Sigma Aldrich, St. Louis, MO) was added to each well, and the cells were further cultured until all the cells were completely denatured. Determination was completed 18 days after seeding, four wells with completely denatured cells were collected in a 1.5-ml Eppen tube, and freezing with liquid nitrogen and thawing with a 37° C. warm bath were repeated 6 times. After the last freeze-thaw cycle, centrifugation (5,000 rpm, 5 minutes, 4° C.) was performed, and the collected supernatant was stored as a primary virus liquid. All of these processes were performed by a method according to the manual of the Adenovirus Dual Expression Kit (TaKaRa, Siga, Japan).

The adenoviral vector into which the CD44/Notch/HIF-3α4 fusion gene is introduced in an expressible manner is referred to as "ADX730."

Purification of High-Titer Recombinant Adenoviral Vector

HEK293 cells and A549 cells (National Institutes of Biomedical Innovation, Health and Nutrition) were cultured to 70 to 100% confluence in a Biocoat Collagen I Cellware 24-well plate (Corning, NY, USA). After the culture, the medium was removed, 0.1 ml of 5% FBS-D-MEM and 10 μl of the primary virus liquid prepared above were added per well, and each cell was infected with the virus. For infection, the plate was slowly shaken several times in an incubator (37° C., 5% $CO_2$), and this operation was performed a total of four times, every 15 minutes. After 1 hour of infection, 0.4 ml of 5% FBS-D-MEM was further added to each well, and the cells were cultured for 3 days. After the culture, one clone, which did not induce cell lysis in the A549 cells and induced cell lysis in the HEK293 cells, was selected, and the cells were collected together with the culture medium.

For the collected cells, freezing with liquid nitrogen and thawing with a 37° C. warm bath were repeated 6 times, as with the primary virus liquid. After the last freeze-thaw cycle, centrifugation (5,000 rpm, 5 minutes, 4° C.) was performed, and the collected supernatant was stored as a secondary virus liquid.

Next, HEK293 cells were cultured to 70 to 100% confluence in a Collagen Type I-Coated 25-$cm^2$ flask (IWAKI), and 0.5 ml of 5% FBS-D-MEM and 15 μl of the secondary virus liquid prepared above were gently added, and the cells were infected with the virus. For infection, the plate was slowly shaken several times in an incubator (37° C., 5% $CO_2$), and this operation was performed a total of four times, every 15 minutes. After 1 hour of infection, 4.5 ml of 5% FBS-D-MEM was further added to each well, and the cells were cultured for 3 days. After the culture, it was confirmed that all the cells were denatured, and the cells were collected together with the culture medium. For the collected cells, freezing with liquid nitrogen and thawing with a 37° C. warm bath were repeated 6 times, as with the primary virus liquid. After the last freeze-thaw cycle, centrifugation (3,000 rpm, 10 minutes, 4° C.) was performed, and the collected supernatant was stored as a tertiary virus liquid. Further, HEK293 cells were cultured to 70 to 100% confluence in a Collagen Type I-Coated 75-$cm^2$ flask (IWAKI), 2 ml of 5% FBS-D-MEM and 50 μl of the tertiary virus liquid prepared above were gently added, and the cells were infected with the virus. For infection, the plate was slowly shaken several times in an incubator (37° C., 5% $CO_2$), and this operation was performed a total of four times, every 15 minutes. After 1 hour of infection, 13 ml of 5% FBS-D-MEM was further added to each well, and the cells were cultured for 3 days. After the culture, it was confirmed that all the cells were denatured, and the cells were collected together with the culture medium. For the collected cells, freezing with liquid nitrogen and thawing with a 37° C. warm bath were repeated 6 times, as with the primary virus liquid. After the last freeze-thaw cycle, centrifugation (3,000 rpm, 10 minutes, 4° C.) was performed, and the collected supernatant was stored as a quaternary virus liquid. All of these processes were performed by a method according to the manual of the Adenovirus Dual Expression Kit (TaKaRa, Siga, Japan).

Structural Confirmation of Recombinant Adenoviral Vector DNA

When the quaternary virus liquid was prepared and dispensed as described above, one sample was centrifuged (5,000 rpm, 5 minutes, 4° C.) after the last freeze-thaw cycle, the entire supernatant was removed, and only the cells were collected and stored (cell pack). The following reagents were added to the cell pack to make the total volume 400 μl.

10×TNE buffer: 40 μl
Proteinase K (20 mg/ml): 4 μl
Sterile purified water: up to 400 μl After the prepared cell pack was thoroughly stirred by vortex mixer, 4 μl of 10% SDS was added, and the mixture was further stirred by vortex mixer. After incubation at 50° C. for 1 hour, phenol-chloroform extraction and chloroform extraction were performed twice, then ethanol precipitation was performed. After ethanol precipitation, the precipitate was dissolved in 50 µl of TE buffer containing RNaseA, and 15 µl of the resulting solution was used to perform restriction enzyme treatment with the restriction enzyme XhoI. After the restriction enzyme treatment, the migration pattern of the obtained product was confirmed by agarose gel electrophoresis. All of these processes were performed by a method according to the manual of the Adenovirus Dual Expression Kit (TaKaRa, Siga, Japan).

In addition, a PCR reaction was performed using the cell pack as a template using insert DNA-specific primers (Table 1) designed and prepared in advance. Agarose gel electrophoresis was performed using the obtained PCR product, and the migration pattern of the insert DNA was confirmed. At the same time, cosmid vector DNA-specific primers and primers for sequence analysis were designed (Table 2), and these primers were used for the PCR reaction using the cell pack as a template. The obtained PCR product was used for agarose gel electrophoresis and purification, and the sequence was confirmed by DNA sequence analysis using it as a template.

TABLE 1

| Primer name | Sequence (5'→3') |
| --- | --- |
| CD44_SwaI-F | Forward: 5'-ACC ATT TAA ATA TGG ACA AGT TTT GGT GGC-3' |
| HIF-3α4_SwaI-R | Reverse: 5'-CGG ATT TAA ATT CAG GGC CAC CAA GGG GG-3' |

TABLE 2

| Primer name | Sequence (5'→3') |
| --- | --- |
| pAxCAwtit2_seq-F1 | 5'-GCG GCT CTA GAG CCT CTG CTA ACC AT-3' |
| pAxCAwtit2_seq-F2 | 5'-GGA CAA GTT TTG GTG GCA CGC AGC CT-3' |
| pAxCAwtit2_seq-F3 | 5'-CCT GAA GAC ATC TAC CCC AGC AAC CC-3' |
| pAxCAwtit2_seq-F4 | 5'-TGC CTC TTC GAC GGC TTT GAC TGC CA-3' |
| pAxCAwtit2_seq-F5 | 5'-GGA GAT TGA CAA CCG GCA GTG TGT GC-3' |
| pAxCAwtit2_seq-F6 | 5'-TCA TGC GCC TCA CCA TCA GCT ACC TG-3' |
| pAxCAwtit2_seq-F7 | 5'-ACA AGC CAC CTG CGC AGA CTT CTC CA-3' |
| pAxCAwtit2_seq-R | 5'-GCT CAA GGG GCT CA TGA TGT CCC CA-3' |

Mass Culture and Purification of Recombinant Adenoviral Vector

In order to use the recombinant adenoviral vector prepared above in the subsequent experiments, mass culture and purification were performed. HEK293 cells were seeded to 70 to 100% confluence in five Corning 225-cm² flasks (Corning, NY, USA). 15 ml of 5% FBS-D-MEM and 150 µl of the tertiary virus liquid prepared above were gently added, and the cells were infected with the virus. For infection, the plate was slowly shaken several times in an incubator (37° C., 5% $CO_2$), and this operation was performed a total of four times, every 15 minutes. After 1 hour of infection, 35 ml of 5% FBS-D-MEM was further added to each well, and the cells were cultured for 3 days. After the culture, it was confirmed that all the cells were denatured, and the cells were collected together with the culture medium. After collection, centrifugation (3000 rpm, 10 minutes, 4° C.) was performed once, the supernatant was removed, 5 ml of fresh 10% FBS-D-MEM was added, and cell pellets were resuspended. Then, freezing with liquid nitrogen and thawing with a 37° C. warm bath were repeated 6 times. After the last freeze-thaw cycle, centrifugation (3000 rpm, 10 minutes, 4° C.) was performed, and the cells were collected again. Only the supernatant was collected, and 5 ml of benzonase nuclease (25 U/µl) (TaKaRa, Siga, Japan) was added and incubated (37° C., 30 minutes). Then, 1× dilution buffer (TaKaRa, Siga, Japan) in an amount equal to the amount of the supernatant was added, and using a 20-ml syringe (TaKaRa, Siga, Japan), the lysate was filtered through a 0.45-µm syringe-tip pre-filter (TaKaRa, Siga, Japan). At the same time, 5 ml of 1× equilibration buffer (TaKaRa, Siga, Japan) was added dropwise to a filter of Adeno-X Maxi Purification Assembly (TaKaRa, Siga, Japan) at a flow rate of 3 ml/min (to 1 drop/sec) for equilibration. The filtered lysate was passed through the equilibrated filter to trap the virus, after which the filter was washed with 20 ml of 1× wash buffer (TaKaRa, Siga, Japan). After washing, the filter was removed and attached to a 5-ml syringe (TaKaRa, Siga, Japan) containing 3 ml of 1× elution buffer (TaKaRa, Siga, Japan), and 1 ml of the 1× elution buffer was extruded from the filter and collected. After collection, the filter was once incubated (room temperature, 5 minutes), and the remaining 2 ml of the 1× solution buffer was then extruded to elute the virus. All of these processes were performed by a method according to the manual of an Adeno-X Maxi Purification Kit (TaKaRa, Siga, Japan).

Measurement of Titer of Recombinant Adenoviral Vector

The titer of the recombinant adenoviral vector prepared above was measured in the following manner. HEK293 cells were seeded in a 12-well flat-bottom cell culture plate (Corning, NY, USA), and a virus liquid diluted by a factor of 10 from 100-fold to 10-million-fold was added dropwise to each well, and the cells were cultured for 2 days. After the culture, the entire medium was removed, the cells were slightly dried, and then 1 ml of cold methanol (FUJIFILM Wako Pure Chemical Corporation, Osaka, Japan) was added dropwise and incubated (−20° C., 10 minutes). Then, the entire methanol was removed, and the resultant was washed three times with Dulbecco's PBS (−) "Nissui" (PBS; Nissui Pharmaceutical Co., Ltd., Tokyo, Japan) containing 1% bovine serum albumin (BSA; Sigma Aldrich, St. Louis, MO). After washing, 0.5 ml of mouse anti-hexon antibody (TaKaRa, Siga, Japan) diluted 1000-fold with PBS containing 1% BSA was added dropwise and incubated (37° C., 1 hour) while shaking with a shaker. After the reaction, the resultant was washed three times with PBS containing 1% BSA, and 0.5 ml of HRP conjugate rat anti-mouse antibody (TaKaRa, Siga, Japan) diluted 500-fold with PBS containing 1% BSA was added dropwise and incubated (37° C., 1 hour) while shaking with a shaker. After the reaction, the resultant was washed three times with PBS containing 1% BSA, and 0.5 ml of 10×DAB substrate (TaKaRa, Siga, Japan) diluted 10-fold with 1× stable peroxidase buffer (TaKaRa, Siga, Japan) was added dropwise and incubated (room temperature, 10 minutes). After the reaction, the entire reaction liquid was removed, 1 ml of PBS was added, and the titer was determined by observing the denatured cells under a microscope. All of these processes were performed by a method according to the manual of an Adeno-X Rapid Titer Kit (TaKaRa, Siga, Japan).

Cells and Medium

Under the conditions of 37° C. and 5% $CO_2$, the HEK293 cells used in the experiment were cultured in D-MEM containing 10% FBS, and 1% 100 U/ml penicillin and 100 mg/ml streptomycin (P/S; Nacalai Tesque, Kyoto, Japan), and the A549 cells were cultured in Ham's F-12K (FUJIFILM Wako Pure Chemical Corporation, Osaka, Japan) containing 10% FBS and 1% P/S. Further, MDA-MB-231 cells (The European Collection of Cell Cultures) were cultured in Leibovitz's L-15 medium (FUJIFILM Wako Pure Chemical Corporation, Osaka, Japan) containing 15% FBS and 1% P/S at 37° C. without $CO_2$ equilibration.

Various Recombinant Viruses

After ADX730 used in the experiment, a genetically modified adenoviral vector incorporated with SOCS3 gene (rAd-SOCS3), a genetically modified adenoviral vector incorporated with p53 gene (rAd-p53), and a genetically modified adenoviral vector incorporated with LacZ gene (rAd-LacZ) were mass-cultured and purified, the buffer was exchanged to a dialysis buffer containing 10% glycerol (Nacalai Tesque, Kyoto, Japan) and 1% 1 mol/l Tris-HCl buffer solution (Nacalai Tesque, Kyoto, Japan) using a Slide-A-Lyzer dialysis cassette (extra strength) (Thermo Fisher Scientific, Waltham, MA), and an appropriate amount of each was dispensed and stored at −80° C.

rAd-SOCS3 and rAd-p53 were adenoviral vectors, which are known cancer gene therapy drug candidates.

Flow Cytometry

Cells were actually infected with ADX730 in vitro, and the comparison of increase and decrease in the expression level of the CD44 region of the fusion gene incorporated into ADX730 was evaluated by flow cytometry. MDA-MB-231 cells were seeded in a 6-well flat-bottom cell culture plate (Corning, NY, USA) at $1\times10^6$ cells/well, and cultured overnight at 37° C. without $CO_2$ equilibration. After the culture, the cells were infected with ADX730, rAd-SOCS3, rAd-p53, or rAd-LacZ at a multiplicity of infection (MOI) of 40, and further cultured for 48 hours. Then, the cells were washed with PBS and collected, and blocking was performed using Blocking One Histo (Nacalai Tesque, Kyoto, Japan) at room temperature for 10 minutes. After blocking, the cells were washed again with PBS, and 200-fold diluted FITC anti-mouse/human CD44 clone: IM7 (BioLegend, San Diego, CA) or 100-fold diluted FITC rat IgG2a, κ isotype ctrl clone: RTK2758 (BioLegend, San Diego, CA) was added dropwise and reacted on ice under shading for 30 minutes. After the reaction, the cells were washed again with PBS, and 100-fold diluted BD Pharmingen 7-AAD (BD Biosciences, San Diego, CA) was added dropwise and reacted on ice under shading for 5 minutes. After the reaction, the resultant was washed with PBS, and the measurement was performed using the Guava easyCyte (Merck Millipore, Burlington, MA). Data analysis was performed according to the included InCyte software.

Real-Time PCR

The gene introduction by each genetically modified adenoviral vector, including ADX730, and the effects obtained by their functions were confirmed by real-time PCR. MDA-MB-231 cells were seeded in a 6-well flat-bottom cell culture plate at $1\times10^6$ cells/well, and cultured overnight under the conditions of 37° C., 5% $CO_2$, 1%≤$O_2$ using AnaeroPack Kenki 5% (Mitsubishi Gas Chemical Company, Inc., Tokyo, Japan) and with 0.04 mg/ml of sodium hyaluronate (40 kDa to 80 kDa) (PG Research, Tokyo, Japan). After the culture, the cells were infected with ADX730, rAd-SOCS3, rAd-p53, or rAd-LacZ at a MOI of 40, and further cultured for 48 hours. Then, the cells were collected, and the total RNA was extracted using NucleoSpin RNA (TaKaRa, Siga, Japan). Further, cDNA was synthesized from the extracted RNA using the PrimeScript RT reagent kit with gDNA Eraser (TaKaRa, Siga, Japan). The cDNA as a template, produced primers (Table 3), TB Green Premix Ex Taq II (TaKaRa, Siga, Japan), and Thermal Cycler Dice Real Time System (TaKaRa, Siga, Japan) were used for analysis by the PCR reaction and the comparative $C_t$ method ($\Delta\Delta C_t$ method)

TABLE 3

| Gene | Sequence (5'→3') |
| --- | --- |
| Bcl-xL | Forward: 5'-CCC AGA AAG GAT ACA GCT GG-3'<br>Reverse: 5'-GCG ATC CGA CTC ACC AAT AC-3' |
| CCL2 | Forward: 5'-AAG ATC TCA GTG CAG AGG CTC G-3'<br>Reverse: 5'-TTG CTT GTC CAG GTG GTC CAT-3' |
| CyclinG2 | Forward: 5'-GCT GAA AGC TTG CAA CTG CCG AC-3'<br>Reverse: 5'-GGT ATC GTT GGC AGC TCA GGA AC-3' |
| HIF-3α4 | Forward: 5'-GGG AGA CAT GGC TTA CCT GT-3'<br>Reverse: 5'-GCG TAC TCT TCA TGC GCA AG-3' |
| p53 | Forward: 5'-CAG CCA AGT CTG TGA CTT GCA CGT AC-3'<br>Reverse: 5'-CTA TGT CGA AAA GTG TTT CTG TCA TC-3' |
| SOCS3 | Forward: 5'-GAC CAG CGC CAC TTC TTC AC-3'<br>Reverse: 5'-CTG GAT GCG CAG GTT CTT G-3' |
| Survivin | Forward: 5'-AGA ACT GGC CCT TCT TGG AGG-3'<br>Reverse: 5'-CTT TTT ATG TTC CTC TAT GGG GTC-3' |
| VEGF | Forward: 5'-GGG CCT CCG AAA CCA TGA AC-3'<br>Reverse: 5'-CAA GGC TCC AAT GCA CCC AA-3' |

Mice and Collection of Samples

In vivo experiments using mice were conducted to examine and compare the antitumor effect of ADX730 with other cancer gene therapy drugs. Using 6-week-old female BALB/cAJc1-nu/nu (CLEA Japan, Inc., Tokyo, Japan), a mixture of MDA-MB-231 cells ($1\times10^6$ cell/70 μl) and 70 μl of Matrigel Matrix Basement Membrane HC (Corning, NY, USA) was inoculated subcutaneously in the right lumbar region of each mouse, and 5 mice in each group were implanted with a tumor (n=5). 14 days after implantation when tumor viability was confirmed, ADX730 ($1\times10^9$ PFU/50 μl), rAd-SOCS3 ($1\times10^9$ PFU/50 μl), rAd-p53 ($1\times10^9$ PFU/50 μl), rAd-LacZ ($1\times10^9$ PFU/50 μl), or 50 μl of PBS was intratumorally administered every other day, eight times in total (days 14, 16, 18, 20, 22, 24, 26, and 28). The tumor diameter was measured twice a week for a total of five times from the day the virus administration was started. After the measurement was completed, the tumor was collected and stored at 4° C. or −80° C. after being fixed with 4% paraformaldehyde phosphate buffer solution (FUJIFILM Wako Pure Chemical Corporation, Osaka, Japan). The volume of the tumor was calculated by measuring the major axis (L) and the minor axis (W) and using the formula $(W^2 \times L)/2$.

Results

Flow Cytometry

A comparison of the average fluorescence intensity of each sample against CD44 revealed that the value was higher when infected with ADX730 than when infected with the other cancer gene therapy drug rAd-SOCS3 or rAd-p53, or the negative control rAd-LacZ (Table 4).

TABLE 4

Analysis of CD44 cell surface expression

| Sample ID | Date | R4.Percent Percent for R4 gated by P01.R1.R2 (%) | R4.Mean Mean for R4 gated by P01.R1.R2 |
|---|---|---|---|
| No virus | Oct. 21, 2019 | 100.00 | 146.61 |
| ADX730 | Oct. 21, 2019 | 100.00 | 215.74 |
| Ad-LacZ | Oct. 21, 2019 | 100.00 | 155.31 |
| Ad-SOCS3 | Oct. 21, 2019 | 100.00 | 103.64 |
| Ad-p53 | Oct. 21, 2019 | 100.00 | 113.49 |

Real-Time PCR

Confirmation of Introduction of Each Recombinant Adenoviral Vector

Cells were infected in vitro with each genetically modified adenoviral vector, including ADX730, and whether the introduction of each gene was successful was evaluated by a real-time PCR test. As an endogenous control gene, TBP (TATA-Box binding protein) gene was used (forward primer: 5'-GCCAGCTTCGGAGAGTTCTGGGATT-3', reverse primer: 5'-CGGGCACGAAGTGCAATGGTCTTTA-3', both used for measuring the expression of the TBP gene). FIG. 3 shows the result of the expression ratio relative to the control gene.

In examination (a), the introduction of the CD44/Notch/HIF-3α4 fusion gene by ADX730 was confirmed and compared using primers targeting HIF-3α4, and it was confirmed that the expression of the CD44/Notch/HIF-3α4 fusion gene was significantly increased in comparison with the other vectors. In examination (b), the introduction of the SOCS3 gene by rAd-SOCS3 was confirmed and compared using primers targeting SOCS3, and it was confirmed that the expression of the SOCS3 gene was significantly increased in comparison with the other vectors. In examination (c), the introduction of the p53 gene by rAd-p53 was confirmed and compared using primers targeting p53, and it was confirmed that the expression of the p53 gene was significantly increased in comparison with the other vectors.

Inhibition of CD44 Downstream Genes by ADX730

Figure 4:
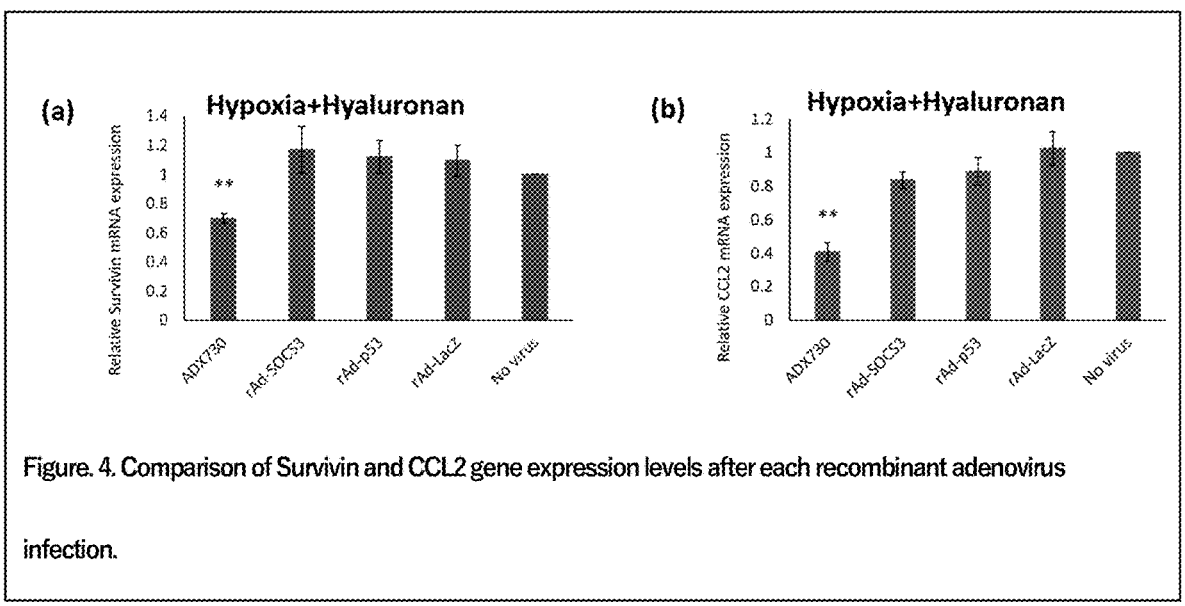

Cells were infected in vitro with each genetically modified adenoviral vector, including ADX730, and whether a CD44 downstream genes were inhibited by the decoy function of the CD44 decoy receptor of ADX730 was compared and examined by a real-time PCR test (FIG. 4). In examination (a), primers targeting Survivin, which is a downstream gene of CD44, were used to compare the expression, and it was confirmed that the introduction of the D44/Notch/HIF-3α4 fusion gene by ADX730 significantly reduced the expression of the Survivin gene. In examination (b), primers targeting CCL2, which is a downstream gene of CD44, were used to compare the expression, and it was confirmed that the introduction of the D44/Notch/HIF-3α4 fusion gene by ADX730 significantly reduced the expression of the CCL2 gene.

Inhibition of HIF-3α4 Target Gene by ADX730

Figure 5:
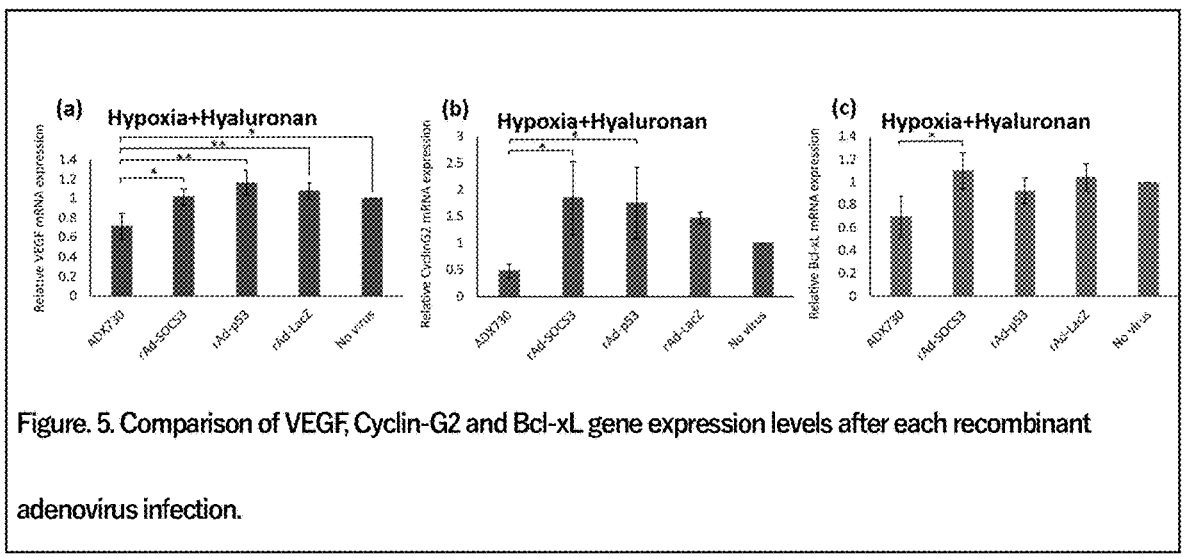
FIG. 5 shows the results of infecting cells in vitro with genetically modified adenoviral vectors, including ADX730, and comparing and examining, by a real-time PCR test, whether the expression of VEGF, CyclinG2, and Bcl-xL genes, which are HIF-1α target genes, was suppressed by the HIF-1a function inhibitory effect of HIF-3α4 of ADX730.

Cells were infected in vitro with each genetically modified adenoviral vector, including ADX730, and whether the expression of the target gene was inhibited by the HIF-1α function inhibitory effect of HIF-3α4 of ADX730 was compared and examined by a real-time PCR test (FIG. 5). In examination (a), primers targeting VEGF, which is a target gene of HIF-1α, were used to compare the expression, and it was confirmed that the introduction of ADX730 significantly reduced the expression. In examination (b), primers targeting CyclinG2, which is a target gene of HIF-1α, were used to compare the expression, and it was confirmed that the introduction of ADX730 significantly reduced the expression in comparison with rAd-SOCS3 and rAd-p53. In examination (c), primers targeting Bcl-xL, which is a target gene of HIF-1α, were used to compare the expression, and it was confirmed that the introduction of ADX730 significantly reduced the expression in comparison with rAd-SOCS3.

In Vivo Test

Figure 6:
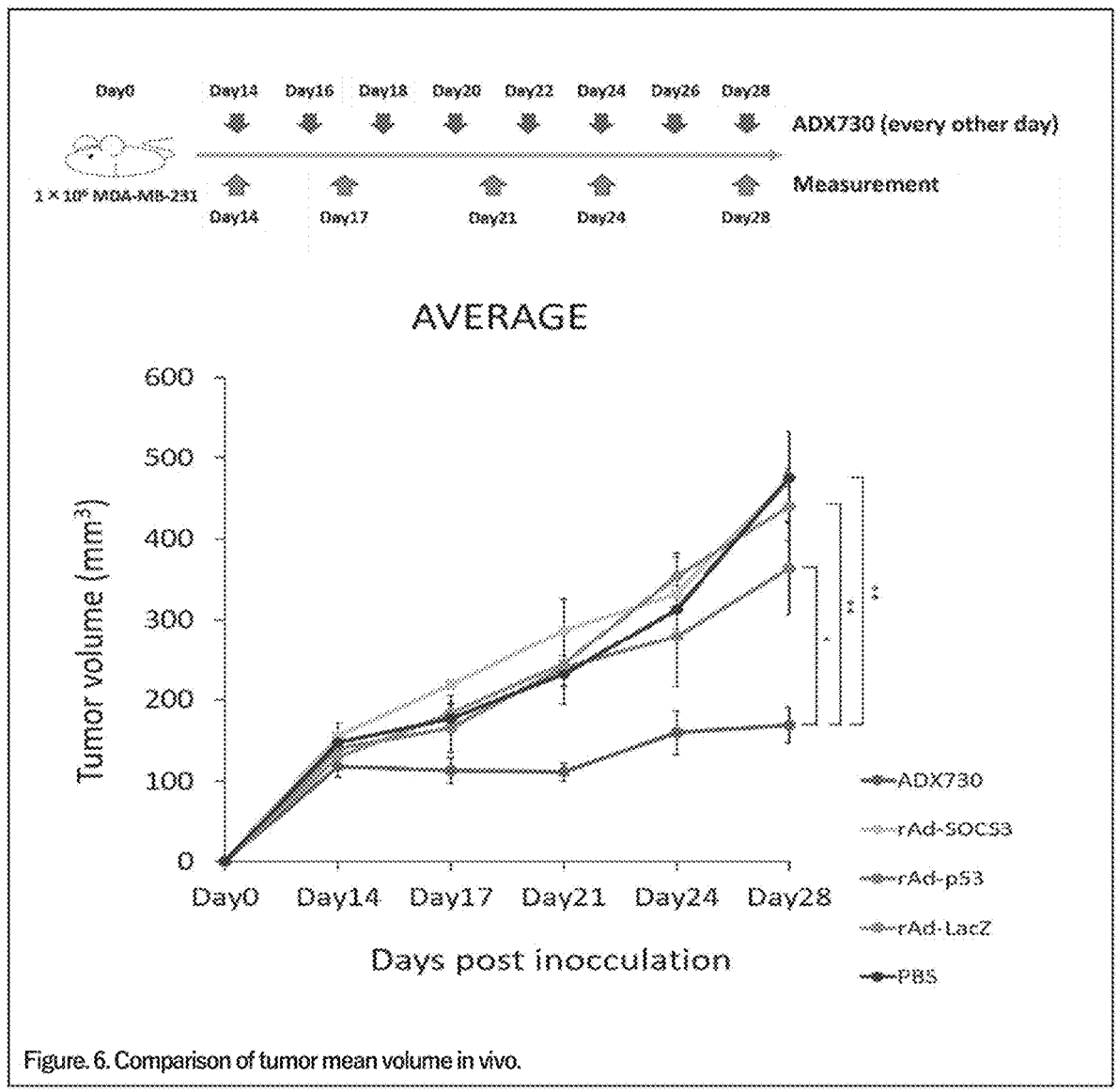
FIG. 6 shows the results of intratumorally administering (injecting) genetically modified adenoviral vectors, including ADX730, to nude mice implanted with MDA-MB-231 human triple-negative breast cancer cells, and examining their tumor growth inhibitory effects. The upper figure is a schematic diagram of the administration schedule. The lower figure is a graph showing how the tumor volume changed by the administration of each genetically modified adenoviral vector or phosphate buffered saline (PBS).

Each genetically modified adenoviral vector, including ADX730 (also referred to as an "cancer gene therapy drug" in this examination) was intratumorally administered (injected) to nude mice implanted with MDA-MB-231 human triple-negative breast cancer cells, and follow-up was performed. 14 days after implantation of the cancer cells into the nude mice, the administration of each therapeutic drug was started, and intratumoral administration was continued every other day, eight times in total. It was found that 28 days after implantation of the cancer cells, the tumor growth was significantly inhibited in the ADX730-administered group in comparison with the other therapeutic drugs and the control group (FIG. 6). After the administration was completed, all of the tumors were extracted and compared (FIG. 7).

The above results revealed that ADX730 showed a high cancer treatment effect even for cancer that is difficult to treat with existing therapeutic drugs, such as triple-negative breast cancer.

Further, breast cancer-derived MDA-MB-231 cells were used in the above examination by real-time PCR; the cells used were changed to prostate cancer-derived DU-145 cells, stomach cancer-derived MKN45 cells, or pancreatic cancer-derived PANC-1 cells, and the gene introduction by each genetically modified adenoviral vector, including ADX730, and the effects obtained by their functions were confirmed by real-time PCR. The number of seeded cells was $5 \times 10^5$ cells/well, and the introduction of the CD44/Notch/HIF-3α4 fusion gene by ADX730 was confirmed and compared using the primer set targeting HIF-3α4 (Table 3). The results are shown in FIG. 8a (DU-145 cells), FIG. 8b (MKN45 cells), and FIG. 8c (PANC-1 cells). It was confirmed that the expression of the CD44/Notch/HIF-3α4 fusion gene was significantly increased when using any of the above cells.

The invention claimed is:

1. A nucleic acid having a structure in which (A) a nucleic acid encoding a protein having a CD44 extracellular function, (B) a nucleic acid encoding a protein having a Notch core region function, and (C) a nucleic acid encoding a protein having an HIF-3α4 function are linked in an order of (A)-(B)-(C).

2. A nucleic acid having a structure in which nucleic acid (A), nucleic acid (B), and nucleic acid (C) are linked in an order of (A)-(B)-(C);
   nucleic acid (A) being:
   (a-1): a nucleic acid consisting of a base sequence of SEQ ID NO: 1, of
   nucleic acid (B) being:
   (b-1): a nucleic acid consisting of a base sequence of SEQ ID NO: 2, or
   and
   nucleic acid (C) being:
   (c-1): a nucleic acid consisting of a base sequence of SEQ ID NO: 3.

3. A nucleic acid that is:
   consisting of the base sequence of SEQ ID NO: 4.

4. The nucleic acid according to claim 1, wherein the nucleic acid comprises a base sequence encoding a protein that can be cleaved by ADAM protease or γ-secretase.

5. A vector into which the nucleic acid according to claim 1 is introduced in an expressible manner.

6. The vector according to claim 5, wherein the vector is an adenoviral vector.

7. A method of treating cancer comprising administrating the nucleic acid according to claim 1 to a subject.

8. An anti-cancer composition comprising the nucleic acid according to claim 1, wherein the anti-cancer composition is formulated as an injection.

9. A method of treating breast cancer, prostate cancer, stomach cancer, or pancreatic cancer comprising administrating the nucleic acid according to claim 1 to a subject.

10. A method of treating triple-negative breast cancer comprising administering the nucleic acid according to claim 1 to a subject.

11. The nucleic acid according to claim 2, wherein the nucleic acid comprises a base sequence encoding a protein that can be cleaved by ADAM protease or γ-secretase.

12. A vector into which the nucleic acid according to claim 2 is introduced in an expressible manner.

13. The vector according to claim 12, wherein the vector is an adenoviral vector.

14. A method of treating cancer comprising administrating the nucleic acid according to claim 2 to a subject.

15. An anti-cancer composition comprising the nucleic acid according to claim 2, wherein the anti-cancer composition is formulated as an injection.

16. A method of treating breast cancer, prostate cancer, stomach cancer, or pancreatic cancer comprising administrating the nucleic acid according to claim 2 to a subject.

17. A method of treating triple-negative breast cancer comprising administering the nucleic acid according to claim 2 to a subject.

18. The nucleic acid according to claim 3, wherein the nucleic acid comprises a base sequence encoding a protein that can be cleaved by ADAM protease or γ-secretase.

19. A vector into which the nucleic acid according to claim 3 is introduced in an expressible manner.

20. The vector according to claim 19, wherein the vector is an adenoviral vector.

\* \* \* \* \*

SEQUENCE LISTING

<160> NUMBER OF SEQ ID NOS: 39

<210> SEQ ID NO 1
<211> LENGTH: 735
<212> TYPE: DNA
<213> ORGANISM: Homo sapiens

<400> SEQUENCE: 1

| | | | | | | |
|---|---|---|---|---|---|---|
| atggacaagt | tttggtggca | cgcagcctgg | ggactctgcc | tcgtgccgct | gagcctggcg | 60 |
| cagatcgatt | tgaatataac | ctgccgcttt | gcaggtgtat | tccacgtgga | gaaaaatggt | 120 |
| cgctacagca | tctctcggac | ggaggccgct | gacctctgca | aggctttcaa | tagcaccttg | 180 |
| cccacaatgg | cccagatgga | gaaagctctg | agcatcggat | ttgagacctg | caggtatggg | 240 |
| ttcatagaag | ggcacgtggt | gattccccgg | atccacccca | actccatctg | tgcagcaaac | 300 |
| aacacagggg | tgtacatcct | cacatccaac | acctcccagt | atgacacata | ttgcttcaat | 360 |
| gcttcagctc | cacctgaaga | agattgtaca | tcagtcacag | acctgccaa | tgcctttgat | 420 |
| ggaccaatta | ccataactat | tgttaaccgt | gatggcaccc | gctatgtcca | gaaaggagaa | 480 |
| tacagaacga | atcctgaaga | catctacccc | agcaacccta | ctgatgatga | cgtgagcagc | 540 |
| ggctcctcca | gtgaaaggag | cagcacttca | ggaggttaca | tcttttacac | cttttctact | 600 |
| gtacacccca | tcccagacga | agacagtccc | tggatcaccg | acagcacaga | cagaatccct | 660 |
| gctaccagac | actcacatgg | gagtcaagaa | ggtggagcaa | acacaacctc | tggtcctata | 720 |
| aggacacccc | aaatt | | | | | 735 |

<210> SEQ ID NO 2
<211> LENGTH: 1029
<212> TYPE: DNA
<213> ORGANISM: Homo sapiens

<400> SEQUENCE: 2

| | | | | | | |
|---|---|---|---|---|---|---|
| atcctggact | acagcttcgg | gggtggggcc | gggcgcgaca | tcccccgcc | gctgatcgag | 60 |
| gaggcgtgcg | agctgcccga | gtgccaggag | gacgcgggca | caaggtctg | cagcctgcag | 120 |
| tgcaacaacc | acgcgtgcgg | ctgggacggc | ggtgactgct | ccctcaactt | caatgacccc | 180 |
| tggaagaact | gcacgcagtc | tctgcagtgc | tggaagtact | tcagtgacgg | ccactgtgac | 240 |
| agccagtgca | actcagccgg | ctgcctcttc | gacggctttg | actgccagcg | tgcggaaggc | 300 |
| cagtgcaacc | ccctgtacga | ccagtactgc | aaggaccact | tcagcgacgg | gcactgcgac | 360 |
| cagggctgca | acagcgcgga | gtgcgagtgg | gacgggctgg | actgtgcgga | gcatgtaccc | 420 |
| gagaggctgg | cggccggcac | gctggtggtg | gtggtgctga | tgccgccgga | gcagctgcgc | 480 |
| aacagctcct | tccacttcct | gcgggagctc | agccgcgtgc | tgcacaccaa | cgtggtcttc | 540 |
| aagcgtgacg | cacacggcca | gcagatgatc | ttcccctact | acggccgcga | ggaggagctg | 600 |
| cgcaagcacc | ccatcaagcg | tgccgccgag | ggctgggccg | cacctgacgc | cctgctgggc | 660 |
| caggtgaagg | cctcgctgct | ccctggtggc | agcgagggtg | ggcggcggcg | gagggagctg | 720 |
| gaccccatgg | acgtccgcgg | ctccatcgtc | tacctggaga | ttgacaaccg | gcagtgtgtg | 780 |
| caggcctcct | cgcagtgctt | ccagagtgcc | accgacgtgg | ccgcattcct | gggagcgctc | 840 |
| gcctcgctgg | gcagcctcaa | catccctac | aagatcgagg | ccgtgcagag | tgagaccgtg | 900 |
| gagccgcccc | cgccggcgca | gctgcacttc | atgtacgtgg | cggcggccgc | ctttgtgctt | 960 |
| ctgttcttcg | tgggctgcgg | ggtgctgctg | tcccgcaagc | gccggcggca | gcatggccag | 1020 |
| ctctggttc | | | | | | 1029 |

<210> SEQ ID NO 3
<211> LENGTH: 1106
<212> TYPE: DNA
<213> ORGANISM: Homo sapiens

<400> SEQUENCE: 3

| | | | | | |
|---|---|---|---|---|---|
| gactggcgag | ccatggcgct | ggggctgcag | cgcgcaaggt | cgaccacgga | gctgcgcaag | 60 |
| gaaaagtccc | gggatgcggc | ccgcagccgg | cgcagccagg | agaccgaggt | gctgtaccag | 120 |
| ctggctcaca | cgctgccctt | cgcccgcggc | gtcagcgccc | acctggacaa | ggcctctatc | 180 |
| atgcgcctca | ccatcagcta | cctgcgcatg | accgcctct | cgccgcagg | ggagtggaac | 240 |
| caggtgggag | caggggaga | accactggat | gcctgctacc | tgaaggccct | ggagggcttc | 300 |
| gtcatggtgc | tcaccgccga | gggagacatg | gcttacctgt | cggagaatgt | cagcaaacac | 360 |
| ctgggcctca | gtcagctgga | gctcattgga | cacagcatct | ttgatttcat | ccacccctgt | 420 |
| gaccaagagg | agcttcagga | cgccctgacc | ccccagcaga | ccctgtccag | gaggaaggtg | 480 |
| gaggccccca | cggagcggtg | cttctccttg | cgcatgaaga | gtacgctcac | cagccgcggg | 540 |
| cgcaccctca | acctcaaggc | ggccacctgg | aaggtgctga | actgctctgg | acatatgagg | 600 |
| gcctacaagc | cacctgcgca | gacttctcca | gctgggagcc | ctgactcaga | gccccgctg | 660 |
| cagtgcctgg | tgctcatctg | cgaagccatc | ccccacccag | gcagcctgga | gccccactg | 720 |
| ggccgagggg | ccttcctcag | ccgccacagc | ctggacatga | agttcaccta | ctgtgacgac | 780 |
| aggattgcag | aagtgctgg | ctatagtccc | gatgacctga | tcggctgttc | cgcctacgag | 840 |
| tacatccacg | cgctggactc | cgacgcggtc | agcaagagca | tccacacctg | tatgtatccc | 900 |
| atttccccag | gtgcgaagcc | agctgccaca | tggcccccag | ctgacaccag | gaccccccag | 960 |
| ctccccatac | cccaggatgc | actgcctccc | cacctcaaca | ccagctccct | gctccccaag | 1020 |
| ccccaaggaa | ctgtctcctt | ccttgccccc | tcatacccag | tccccagatc | tttctctccc | 1080 |
| catttgcccc | cttggtggcc | ctgatc | | | | 1106 |

<210> SEQ ID NO 4
<211> LENGTH: 2870
<212> TYPE: DNA
<213> ORGANISM: Artificial Sequence
<220> FEATURE:
<223> OTHER INFORMATION: DNA Sequence of ADX730

<400> SEQUENCE: 4

| | | | | | |
|---|---|---|---|---|---|
| atggacaagt | tttggtggca | cgcagcctgg | ggactctgcc | tcgtgccgct | gagcctggcg | 60 |
| cagatcgatt | tgaatataac | ctgccgcttt | gcaggtgtat | tccacgtgga | gaaaaatggt | 120 |
| cgctacagca | tctctcggac | ggaggccgct | gacctctgca | aggctttcaa | tagcaccttg | 180 |
| cccacaatgg | cccagatgga | gaaagctctg | agcatcggat | ttgagacctg | caggtatggg | 240 |
| ttcatagaag | ggcacgtggt | gattcccggg | atccacccca | actccatctg | tgcagcaaac | 300 |
| aacacagggg | tgtacatcct | cacatccaac | acctcccagt | atgacacata | ttgcttcaat | 360 |
| gcttcagctc | cacctgaaga | agattgtaca | tcagtcacag | acctgcccaa | tgcctttgat | 420 |
| ggaccaatta | ccataactat | tgttaaccgt | gatggcaccc | gctatgtcca | gaaaggagaa | 480 |
| tacagaacga | atcctgaaga | catctacccc | agcaacccta | ctgatgatga | cgtgagcagc | 540 |
| ggctcctcca | gtgaaaggag | cagcacttca | ggaggttaca | tcttttacac | cttttctact | 600 |
| gtacaccccca | tcccagacga | agacagtccc | tggatcaccg | acagcacaga | cagaatccct | 660 |

```
gctaccagac actcacatgg gagtcaagaa ggtggagcaa acacaacctc tggtcctata    720
aggacacccc aaattatcct ggactacagc ttcgggggtg gggccgggcg cgacatcccc    780
ccgccgctga tcgaggaggc gtgcgagctg cccgagtgcc aggaggacgc gggcaacaag    840
gtctgcagcc tgcagtgcaa caaccacgcg tgcggctggg acggcggtga ctgctccctc    900
aacttcaatg accccctgga gaactgcacg cagtctctgc agtgctggaa gtacttcagt    960
gacggccact gtgacagcca gtgcaactca gccggctgcc tcttcgacgg ctttgactgc   1020
cagcgtgcgg aaggccagtg caaccccctg tacgaccagt actgcaagga ccacttcagc   1080
gacgggcact gcgaccaggg ctgcaacagc gcggagtgcg agtgggacgg ctggactgt    1140 gcggagcatg tacccgagag gctggcggcc ggcacgctgg tggtggtggt gctgatgccg   1200
ccggagcagc tgcgcaacag ctccttccac ttcctgcggg agctcagccg cgtgctgcac   1260
accaacgtgg tcttcaagcg tgacgcacac ggccagcaga tgatcttccc ctactacggc   1320
cgcgaggagg agctgcgcaa gcaccccatc aagcgtgccg ccgagggctg gccgcacct    1380 gacgccctgc tgggccaggt gaaggcctcg ctgctccctg gtggcagcga gggtgggcgg   1440
cggcggaggg agctggaccc catggacgtc cgcggctcca tcgtctacct ggagattgac   1500
aaccggcagt gtgtgcaggc ctcctcgcag tgcttccaga gtgccaccga cgtggccgca   1560
ttcctgggag cgctcgcctc gctgggcagc ctcaacatcc cctacaagat cgaggccgtg   1620
cagagtgaga ccgtggagcc gccccgccg gcgcagctgc acttcatgta cgtggcggcg    1680
gccgcctttg tgcttctgtt cttcgtgggc tgcggggtgc tgctgtcccg caagcgccgg   1740
cggcagcatg gccagctctg gttcgactgg cgagccatgg cgctgggct gcagcgcgca    1800 aggtcgacca cggagctgcg caaggaaaag tcccgggatg cggcccgcag ccggcgcagc   1860
caggagaccg aggtgctgta ccagctggct cacacgctgc ccttcgcccg cggcgtcagc   1920
gcccacctgg acaaggcctc tatcatgcgc ctcaccatca gctacctgcg catgcaccgc   1980
ctctgcgccg caggggagtg gaaccaggtg ggagcagggg gagaaccact ggatgcctgc   2040
tacctgaagg ccctggaggg cttcgtcatg gtgctcaccg ccgagggaga catggcttac   2100
ctgtcggaga atgtcagcaa acacctgggc ctcagtcagc tggagctcat ggacacagc    2160 atctttgatt tcatccaccc ctgtgaccaa gaggagcttc aggacgccct gacccccag    2220 cagaccctgt ccaggaggaa ggtggaggcc cccacggagc ggtgcttctc cttgcgcatg   2280
aagagtacgc tcaccagccg cgggcgcacc ctcaacctca aggcggccac ctggaaggtg   2340
ctgaactgct ctggacatat gagggcctac aagccacctg cgcagacttc tccagctggg   2400
agccctgact cagagccccc gctgcagtgc ctggtgctca tctgcgaagc catccccac    2460 ccaggcagcc tggagccccc actgggccga ggggccttcc tcagccgcca cagcctggac   2520
atgaagttca cctactgtga cgacaggatt gcagaagtgg ctggctatag tcccgatgac   2580
ctgatcggct gttccgccta cgagtacatc acgcgctgg actccgacgc ggtcagcaag    2640
agcatccaca cctgtatgta tcccatttcc ccaggtgcga agccagctgc cacatggccc   2700
ccagctgaca ccaggacccc ccagctcccc atacccccagg atgcactgcc tccccacctc   2760
aacaccagct ccctgctccc caagcccaa ggaactgtct ccttccttgc ccctcatac    2820 ccagtcccca gatctttctc tccccatttg cccccttggt ggccctgatc                2870

<210> SEQ ID NO 5
<211> LENGTH: 951
<212> TYPE: PRT
<213> ORGANISM: Artificial Sequence
```

<220> FEATURE:
<223> OTHER INFORMATION: Amino acid Sequence of ADX730

<400> SEQUENCE: 5

```
Met Asp Lys Phe Trp Trp His Ala Ala Trp Gly Leu Cys Leu Val Pro
1               5                   10                  15

Leu Ser Leu Ala Gln Ile Asp Leu Asn Ile Thr Cys Arg Phe Ala Gly
            20                  25                  30

Val Phe His Val Glu Lys Asn Gly Arg Tyr Ser Ile Ser Arg Thr Glu
        35                  40                  45

Ala Ala Asp Leu Cys Lys Ala Phe Asn Ser Thr Leu Pro Thr Met Ala
    50                  55                  60

Gln Met Glu Lys Ala Leu Ser Ile Gly Phe Glu Thr Cys Arg Tyr Gly
65                  70                  75                  80

Phe Ile Glu Gly His Val Val Ile Pro Arg Ile His Pro Asn Ser Ile
                85                  90                  95

Cys Ala Ala Asn Asn Thr Gly Val Tyr Ile Leu Thr Ser Asn Thr Ser
            100                 105                 110

Gln Tyr Asp Thr Tyr Cys Phe Asn Ala Ser Ala Pro Pro Glu Glu Asp
        115                 120                 125

Cys Thr Ser Val Thr Asp Leu Pro Asn Ala Phe Asp Gly Pro Ile Thr
    130                 135                 140

Ile Thr Ile Val Asn Arg Asp Gly Thr Arg Tyr Val Gln Lys Gly Glu
145                 150                 155                 160

Tyr Arg Thr Asn Pro Glu Asp Ile Tyr Pro Ser Asn Pro Thr Asp Asp
                165                 170                 175

Asp Val Ser Ser Gly Ser Ser Ser Glu Arg Ser Ser Thr Ser Gly Gly
            180                 185                 190

Tyr Ile Phe Tyr Thr Phe Ser Thr Val His Pro Ile Pro Asp Glu Asp
        195                 200                 205

Ser Pro Trp Ile Thr Asp Ser Thr Asp Arg Ile Pro Ala Thr Arg His
    210                 215                 220

Ser His Gly Ser Gln Glu Gly Gly Ala Asn Thr Thr Ser Gly Pro Ile
225                 230                 235                 240

Arg Thr Pro Gln Ile Ile Leu Asp Tyr Ser Phe Gly Gly Gly Ala Gly
                245                 250                 255

Arg Asp Ile Pro Pro Pro Leu Ile Glu Glu Ala Cys Glu Leu Pro Glu
            260                 265                 270

Cys Gln Glu Asp Ala Gly Asn Lys Val Cys Ser Leu Gln Cys Asn Asn
        275                 280                 285

His Ala Cys Gly Trp Asp Gly Gly Asp Cys Ser Leu Asn Phe Asn Asp
    290                 295                 300

Pro Trp Lys Asn Cys Thr Gln Ser Leu Gln Cys Trp Lys Tyr Phe Ser
305                 310                 315                 320

Asp Gly His Cys Asp Ser Gln Cys Asn Ser Ala Gly Cys Leu Phe Asp
                325                 330                 335

Gly Phe Asp Cys Gln Arg Ala Glu Gly Gln Cys Asn Pro Leu Tyr Asp
            340                 345                 350

Gln Tyr Cys Lys Asp His Phe Ser Asp Gly His Cys Asp Gln Gly Cys
        355                 360                 365

Asn Ser Ala Glu Cys Glu Trp Asp Gly Leu Asp Cys Ala Glu His Val
    370                 375                 380

Pro Glu Arg Leu Ala Ala Gly Thr Leu Val Val Val Val Leu Met Pro
385                 390                 395                 400
```

```
Pro Glu Gln Leu Arg Asn Ser Ser Phe His Phe Leu Arg Glu Leu Ser
            405                 410                 415

Arg Val Leu His Thr Asn Val Val Phe Lys Arg Asp Ala His Gly Gln
        420                 425                 430

Gln Met Ile Phe Pro Tyr Tyr Gly Arg Glu Glu Leu Arg Lys His
        435                 440                 445

Pro Ile Lys Arg Ala Ala Glu Gly Trp Ala Ala Pro Asp Ala Leu Leu
    450                 455                 460

Gly Gln Val Lys Ala Ser Leu Leu Pro Gly Gly Ser Glu Gly Gly Arg
465                 470                 475                 480

Arg Arg Arg Glu Leu Asp Pro Met Asp Val Arg Gly Ser Ile Val Tyr
                485                 490                 495

Leu Glu Ile Asp Asn Arg Gln Cys Val Gln Ala Ser Ser Gln Cys Phe
                500                 505                 510

Gln Ser Ala Thr Asp Val Ala Ala Phe Leu Gly Ala Leu Ala Ser Leu
            515                 520                 525

Gly Ser Leu Asn Ile Pro Tyr Lys Ile Glu Ala Val Gln Ser Glu Thr
        530                 535                 540

Val Glu Pro Pro Pro Ala Gln Leu His Phe Met Tyr Val Ala Ala
545                 550                 555                 560

Ala Ala Phe Val Leu Leu Phe Phe Val Gly Cys Gly Val Leu Leu Ser
                565                 570                 575

Arg Lys Arg Arg Arg Gln His Gly Gln Leu Trp Phe Met Ala Leu Gly
                580                 585                 590

Leu Gln Arg Ala Arg Ser Thr Thr Glu Leu Arg Lys Glu Lys Ser Arg
        595                 600                 605

Asp Ala Ala Arg Ser Arg Arg Ser Gln Glu Thr Glu Val Leu Tyr Gln
    610                 615                 620

Leu Ala His Thr Leu Pro Phe Ala Arg Gly Val Ser Ala His Leu Asp
625                 630                 635                 640

Lys Ala Ser Ile Met Arg Leu Thr Ile Ser Tyr Leu Arg Met His Arg
                645                 650                 655

Leu Cys Ala Ala Gly Glu Trp Asn Gln Val Gly Ala Gly Gly Glu Pro
                660                 665                 670

Leu Asp Ala Cys Tyr Leu Lys Ala Leu Glu Gly Phe Val Met Val Leu
        675                 680                 685

Thr Ala Glu Gly Asp Met Ala Tyr Leu Ser Glu Asn Val Ser Lys His
    690                 695                 700

Leu Gly Leu Ser Gln Leu Glu Leu Ile Gly His Ser Ile Phe Asp Phe
705                 710                 715                 720

Ile His Pro Cys Asp Gln Glu Glu Leu Gln Asp Ala Leu Thr Pro Gln
                725                 730                 735

Gln Thr Leu Ser Arg Arg Lys Val Glu Ala Pro Thr Glu Arg Cys Phe
            740                 745                 750

Ser Leu Arg Met Lys Ser Thr Leu Thr Ser Arg Gly Arg Thr Leu Asn
        755                 760                 765

Leu Lys Ala Ala Thr Trp Lys Val Leu Asn Cys Ser Gly His Met Arg
    770                 775                 780

Ala Tyr Lys Pro Pro Ala Gln Thr Ser Pro Ala Gly Ser Pro Asp Ser
785                 790                 795                 800

Glu Pro Pro Leu Gln Cys Leu Val Leu Ile Cys Glu Ala Ile Pro His
                805                 810                 815
```

Pro Gly Ser Leu Glu Pro Pro Leu Gly Arg Gly Ala Phe Leu Ser Arg
               820                 825                 830

His Ser Leu Asp Met Lys Phe Thr Tyr Cys Asp Asp Arg Ile Ala Glu
           835                 840                 845

Val Ala Gly Tyr Ser Pro Asp Asp Leu Ile Gly Cys Ser Ala Tyr Glu
       850                 855                 860

Tyr Ile His Ala Leu Asp Ser Asp Ala Val Ser Lys Ser Ile His Thr
865                 870                 875                 880

Cys Met Tyr Pro Ile Ser Pro Gly Ala Lys Pro Ala Ala Thr Trp Pro
               885                 890                 895

Pro Ala Asp Thr Arg Thr Pro Gln Leu Pro Ile Pro Gln Asp Ala Leu
           900                 905                 910

Pro Pro His Leu Asn Thr Ser Ser Leu Leu Pro Lys Pro Gln Gly Thr
       915                 920                 925

Val Ser Phe Leu Ala Pro Ser Tyr Pro Val Pro Arg Ser Phe Ser Pro
       930                 935                 940

His Leu Pro Pro Trp Trp Pro
945                 950

<210> SEQ ID NO 6
<211> LENGTH: 1023
<212> TYPE: DNA
<213> ORGANISM: Homo sapiens

<400> SEQUENCE: 6

| | | | | | |
|---|---|---|---|---|---|
| atggacaagt | tttggtggca | cgcagcctgg | ggactctgcc | tcgtgccgct | gagcctggcg | 60 |
| cagatcgatt | tgaatataac | ctgccgcttt | gcaggtgtat | tccacgtgga | gaaaaatggt | 120 |
| cgctacagca | tctctcggac | ggaggccgct | gacctctgca | aggctttcaa | tagcaccttg | 180 |
| cccacaatgg | cccagatgga | gaaagctctg | agcatcggat | ttgagacctg | caggtatggg | 240 |
| ttcatagaag | ggcacgtggt | gattccccgg | atccacccca | actccatctg | tgcagcaaac | 300 |
| aacacagggg | tgtacatcct | cacatccaac | acctcccagt | atgacacata | ttgcttcaat | 360 |
| gcttcagctc | cacctgaaga | agattgtaca | tcagtcacag | acctgcccaa | tgcctttgat | 420 |
| ggaccaatta | ccataactat | tgttaaccgt | gatggcaccc | gctatgtcca | gaaggagaa | 480 |
| tacagaacga | atcctgaaga | catctacccc | agcaaccctg | ctgatgatga | cgtgagcagc | 540 |
| ggctcctcca | gtgaaaggag | cagcacttca | ggaggttaca | tcttttacac | cttttctact | 600 |
| gtacacccca | tcccagacga | agacagtccc | tggatcaccg | acagcacaga | cagaatccct | 660 |
| gctaccagac | actcacatgg | gagtcaagaa | ggtggagcaa | acacaacctc | tggtcctata | 720 |
| aggacacccc | aaattccaga | atggctgatc | atcttggcat | ccctcttggc | cttggctttg | 780 |
| attcttgcag | tttgcattgc | agtcaacagt | cgaagaaggt | gtgggcagaa | gaaaaagcta | 840 |
| gtgatcaaca | gtggcaatgg | agctgtggag | acagaaagc | caagtggact | caacggagag | 900 |
| gccagcaagt | ctcaggaaat | ggtgcatttg | gtgaacaagg | agtcgtcaga | aactccagac | 960 |
| cagtttatga | cagctgatga | gacaaggaac | ctgcagaatg | tggacatgaa | gattggggtg | 1020 |
| taa | | | | | | 1023 |

<210> SEQ ID NO 7
<211> LENGTH: 7693
<212> TYPE: DNA
<213> ORGANISM: Homo sapiens

<400> SEQUENCE: 7

```
atgccgccgc tcctggcgcc cctgctctgc ctggcgctgc tgcccgcgct cgccgcacga    60
ggcccgcgat gctcccagcc cggtgagacc tgcctgaatg gcgggaagtg tgaagcggcc   120
aatggcacgg aggcctgcgt ctgtggcggg gccttcgtgg gcccgcgatg ccaggacccc   180
aacccgtgcc tcagcacccc ctgcaagaac gccgggacat gccacgtggt ggaccgcaga   240
ggcgtggcag actatgcctg cagctgtgcc ctgggcttct ctgggcccct ctgcctgaca   300
cccctggaca cgcctgcct caccaacccc tgccgcaacg ggggcacctg cgacctgctc   360
acgctgacgg agtacaagtg ccgctgcccg cccggctggt cagggaaatc gtgccagcag   420
gctgacccgt gcgcctccaa cccctgcgcc aacggtggcc agtgcctgcc cttcgaggcc   480
tcctacatct gccactgccc acccagcttc catggcccca cctgccggca ggatgtcaac   540
gagtgtggcc agaagcccag gctttgccgc cacggaggca cctgccacaa cgaggtcggc   600
tcctaccgct gcgtctgccg cgccacccac actggcccca actgcgagcg ccctacgtg    660 ccctgcagcc cctcgccctg ccagaacggg ggcacctgcc gccccacggg cgacgtcacc   720
cacgagtgtg cctgcctgcc aggcttcacc ggccagaact gtgaggaaaa tatcgacgat   780
tgtccaggaa acaactgcaa gaacgggggt gcctgtgtgg acggcgtgaa cacctacaac   840
tgcccgtgcc cgccagagtg gacaggtcag tactgtaccg aggatgtgga cgagtgccag   900
ctgatgccaa atgcctgcca gaacggcggg acctgccaca cacccacgg tggctacaac   960 tgcgtgtgtg tcaacggctg gactggtgag gactgcagcg agaacattga tgactgtgcc  1020
agcgccgcct gcttccacgg cgccacctgc atgaccgtg tggcctcctt ttactgcgag  1080 tgtcccatg ccgcacagg tctgctgtgc cacctcaacg acgcatgcat cagcaacccc  1140
tgtaacgagg gctccaactg cgacaccaac cctgtcaatg caaggccat ctgcacctgc  1200 ccctcgggt acacgggccc ggcctgcagc caggacgtgg atgagtgctc gctgggtgcc  1260 aaccccctgcg agcatgcggg caagtgcatc aacacgctgg gctccttcga gtgccagtgt  1320
ctgcagggct acacgggccc ccgatgcgag atcgacgtca acgagtgcgt ctcgaacccg  1380
tgccagaacg acgccacctg cctggaccag attggggagt ccagtgcat gtgcatgccc  1440 ggctacgagg tgtgcactg cgaggtcaac acagacgagt gtgccagcag ccctgcctg  1500 cacaatggcc gctgcctgga caagatcaat gagttccagt gcgagtgccc cacgggcttc  1560
actgggcatc tgtgccagta cgatgtggac gagtgtgcca gcacccctg caagaatggt  1620 gccaagtgcc tggacggacc caacacttac acctgtgtgt gcacggaagg gtacacgggg  1680
acgcactgcg aggtggacat cgatgagtgc gaccccgacc cctgccacta cggctcctgc  1740
aaggacggcg tcgccacctt cacctgcctc tgccgcccag gctacacggg ccaccactgc  1800
gagaccaaca tcaacgagtg ctccagccag ccctgccgcc tacggggcac ctgccaggac  1860
ccggacaacg cctacctctg cttctgcctg aaggggacca caggacccaa ctgcgagatc  1920
aacctggatg actgtgccag cagcccctgc gactcgggca cctgtctgga caagatcgat  1980
ggctacgagt gtgcctgtga gccgggctac acagggagca tgtgtaacag caacatcgat  2040
gagtgtgcgg gcaaccctg ccacaacggg ggcacctgcg aggacggcat caatggcttc  2100
acctgccgct gcccgaggg ctaccacgac cccacctgcc tgtctgaggt caatgagtgc  2160
aacagcaacc cctgcgtcca ggggcctgc cgggacagcc tcaacgggta caagtgcgac  2220
tgtgaccctg ggtggagtgg gaccaactgt gacatcaaca caacgagtg tgaatccaac  2280 ccttgtgtca acgcggcac ctgcaaagac atgaccagtg catcgtgtg cacctgccgg  2340 gagggcttca gcggtcccaa ctgccagacc aacatcaacg agtgtgcgtc caacccatgt  2400
```

```
ctgaacaagg gcacgtgtat tgacgacgtt gccgggtaca agtgcaactg cctgctgccc    2460
tacacaggtg ccacgtgtga ggtggtgctg gccccgtgtg cccccagccc ctgcagaaac    2520 ggcgggagt gcaggcaatc cgaggactat gagagcttct cctgtgtctg ccccacggct    2580 gggccaaag gcagacctg tgaggtcgac atcaacgagt gcgttctgag cccgtgccgg    2640
cacggcgcat cctgccagaa cacccacggc gsstaccgct gccactgcca ggccggctac    2700
agtgggcgca actgcgagac cgacatcgac gactgccggc ccaacccgtg tcacaacggg    2760
ggctcctgca cagacggcat caacacggcc ttctgcgact gcctgccgg cttccgggc    2820 actttctgtg aggaggacat caacgagtgt gccagtgacc cctgccgcaa cggggccaac    2880
tgcacggact gcgtggacag ctacacgtgc acctgccccg caggcttcag cgggatccac    2940
tgtgagaaca cacgcctga ctgcacagag agctcctgct tcaacggtgg cacctgcgtg    3000
gacggcatca actcgttcac ctgcctgtgt ccacccggct tcacgggcag ctactgccag    3060
cacgtagtca atgagtgcga ctcacgaccc tgcctgctag gcggcacctg tcaggacggt    3120
cgcggtctcc acaggtgcac ctgcccccag ggctacactg gccccaactg ccagaacctt    3180
gtgcactggt gtgactcctc gccctgcaag aacggcggca aatgctggca gacccacacc    3240
cagtaccgct gcgagtgccc cagcggctgg accggccttt actgcgacgt gcccagcgtg    3300
tcctgtgagg tggctgcgca gcgacaaggt gttgacgttg cccgcctgtg ccagcatgga    3360
gggctctgtg tggacgcggg caacacgcac cactgccgct gccaggcggg ctacacaggc    3420
agctactgtg aggacctggt ggacgagtgc tcacccagcc cctgccagaa cggggccacc    3480
tgcacggact acctgggcgg ctactcctgc aagtgcgtgg ccggctacca cggggtgaac    3540
tgctctgagg agatcgacga gtgcctctcc caccccctgcc agaacggggg cacctgcctc    3600
gacctcccca cacctacaa gtgctcctgc ccacggggca ctcagggtgt gcactgtgag    3660
atcaacgtgg acgactgcaa tccccccgtt gaccccgtgt cccggagccc caagtgcttt    3720
aacaacggca cctgcgtgga ccaggtgggc ggctacagct gcacctgccc gccgggcttc    3780
gtgggtgagc gctgtgaggg ggatgtcaac gagtgcctgt ccaatccctg cgacgcccgt    3840
ggcacccaga actgcgtgca gcgcgtcaat gacttccact gcgagtgccg tgctggtcac    3900
accgggcgcc gctgcgagtc cgtcatcaat ggctgcaaag gcaagccctg caagaatggg    3960
ggcacctgcg ccgtggcctc caacaccgcc cgcgggttca tctgcaagtg ccctgcgggc    4020
ttcgagggcg ccacgtgtga gaatgacgct cgtacctgcg gcagcctgcg ctgcctcaac    4080
ggcggcacat gcatctccgg cccgcgcagc cccacctgcc tgtgcctggg cccttcacg    4140 ggccccgaat gccagttccc ggccagcagc ccctgcctgg gcggcaaccc ctgctacaac    4200 cagggggacct gtgagcccac atccgagagc cccttctacc gttgcctgtg ccccgccaaa    4260
ttcaacgggc tcttgtgcca catcctggac tacagcttcg ggggtggggc cgggcgcgac    4320
atccccccgc cgctgatcga ggaggcgtgc gagctgcccg agtgccagga ggacgcgggc    4380
aacaaggtct gcagcctgca gtgcaacaac cacgcgtgcg gctgggacgg cggtgactgc    4440
tccctcaact tcaatgaccc ctggaagaac tgcacgcagt ctctgcagtg ctggaagtac    4500
ttcagtgacg gccactgtga cagccagtgc aactcagccg cctgcctctt cgacggcttt    4560
gactgccagc gtgcggaagg ccagtgcaac cccctgtacg accagtactg caaggaccac    4620
ttcagcgacg gcactgcga ccagggctgc aacagcgcgg agtgcgagtg gacgggctg    4680 gactgtgcgg agcatgtacc cgagaggctg gcggccggca cgctggtggt ggtggtgctg    4740
```

```
atgccgccgg agcagctgcg caacagctcc ttccacttcc tgcgggagct cagccgcgtg    4800
ctgcacacca acgtggtctt caagcgtgac gcacacggcc agcagatgat cttccctac    4860 tacggccgcg aggaggagct gcgcaagcac cccatcaagc gtgccgccga gggctgggcc    4920
gcacctgacg ccctgctggg ccaggtgaag gcctcgctgc tccctggtgg cagcgagggt    4980
gggcggcggc ggagggagct ggaccccatg gacgtccgcg gctccatcgt ctacctggag    5040
attgacaacc ggcagtgtgt gcaggcctcc tcgcagtgct tccagagtgc caccgacgtg    5100
gccgcattcc tgggagcgct cgcctcgctg ggcagcctca acatccccta caagatcgag    5160
gccgtgcaga gtgagaccgt ggagccgccc cgccggcgc agctgcactt catgtacgtg    5220
gcggcggccg cctttgtgct tctgttcttc gtgggctgcg gggtgctgct gtcccgcaag    5280
cgccggcggc agcatggcca gctctggttc cctgagggct tcaaagtgtc tgaggccagc    5340
aagaagaagc ggcgggagcc cctcggcgag gactccgtgg gcctcaagcc cctgaagaac    5400
gcttcagacg gtgccctcat ggacgacaac cagaatgagt gggggacga ggacctggag    5460 accaagaagt tccggttcga ggagcccgtg gttctgcctg acctggacga ccagacagac    5520
caccggcagt ggactcagca gcacctggat gccgctgacc tgcgcatgtc tgccatggcc    5580
cccacaccgc cccagggtga ggttgacgcc gactgcatgg acgtcaatgt ccgcgggcct    5640
gatggcttca ccccgctcat gatcgcctcc tgcagcgggg gcggcctgga cgggcaac    5700 agcgaggaag aggaggacgc gccggccgtc atctccgact tcatctacca gggcgccagc    5760
ctgcacaacc agacagaccg cacgggcgag accgccttgc acctggccgc cgctactca    5820 cgctctgatg ccgccaagcg cctgctggag gccagcgcag atgccaacat ccaggacaac    5880
atgggccgca ccccgctgca tgcggctgtg tctgccgacg cacaaggtgt cttccagatc    5940
ctgatccgga accgagccac agacctggat gcccgcatgc atgatggcac gacgccactg    6000
atcctggctg cccgcctggc cgtggagggc atgctggagg acctcatcaa ctcacacgcc    6060
gacgtcaacg ccgtagatga cctgggcaag tccccctgc actgggccgc cgccgtgaac    6120
aatgtggatg ccgcagttgt gctcctgaag aacggggcta acaaagatat gcagaacaac    6180
agggaggaga caccctgtt tctggccgcc cgggagggca gctacgagac cgccaaggtg    6240
ctgctggacc actttgccaa ccgggacatc acggatcata tggaccgcct gccgcgcgac    6300
atcgcacagg agcgcatgca tcacgacatc gtgaggctgc tggacgagta caacctggtg    6360
cgcagcccgc agctgcacgg agccccgctg gggggcacgc ccaccctgtc gccccgctc    6420 tgctcgccca acggctacct gggcagcctc aagcccggcg tgcagggcaa gaaggtccgc    6480
aagcccagca gcaaaggcct ggcctgtgga agcaaggagg ccaaggacct caaggcacgg    6540
aggaagaagt cccaggatgg caagggctgc ctgctggaca gctccggcat gctctcgccc    6600
gtggactccc tggagtcacc ccatggctac ctgtcagacg tggcctcgcc gccactgctg    6660
ccctccccgt tccagcagtc tccgtccgtg cccctcaacc acctgcctgg gatgcccgac    6720
acccacctgg gcatcgggca cctgaacgtg gcggccaagc cgagatggc ggcgctgggt    6780 gggggcggcc ggctggcctt tgagactggc ccacctcgtc tctcccacct gcctgtggcc    6840
tctggcacca gcaccgtcct gggctccagc agcgaggggg ccctgaattt cactgtgggc    6900
gggtccacca gtttgaatgg tcaatgcgag tggctgtccc ggctgcagag cggcatggtg    6960
ccgaaccaat acaaccctct gcgggggagt gtggcaccag ccccctgag cacacaggcc    7020 ccctccctgc agcatggcat ggtaggcccg ctgcacagta gccttgctgc cagcgccctg    7080
tcccagatga tgagctacca gggcctgccc agcacccggc tggccaccca gcctcacctg    7140
```

```
gtgcagaccc agcaggtgca gccacaaaac ttacagatgc agcagcagaa cctgcagcca    7200
gcaaacatcc agcagcagca aagcctgcag ccgccaccac caccaccaca gccgcacctt    7260
ggcgtgagct cagcagccag cggccacctg gccggagct tcctgagtgg agagccgagc    7320
caggcagacg tgcagccact gggccccagc agcctggcgg tgcacactat tctgccccag    7380
gagagccccg ccctgcccac gtcgctgcca tcctcgctgg tcccacccgt gaccgcagcc    7440
cagttcctga cgccccctc gcagcacagc tactcctcgc ctgtggacaa cacccccagc    7500
caccagctac aggtgcctga caccccttc ctgaccccctt cgccggagtc gcccgaccaa    7560
tggtcgtcct cgtcgccgca ctctaatgtg tctgactggt ctgagggcgt gtcgtcgccc    7620
ccgacctcca tgcagtccca gatcgcgcgc atcccggagg cgttcaagta atagctcgag    7680
gtgccagcag ctc                                                      7693

<210> SEQ ID NO 8
<211> LENGTH: 1106
<212> TYPE: DNA
<213> ORGANISM: Homo sapiens

<400> SEQUENCE: 8
gactggcgag ccatggcgct ggggctgcag cgcgcaaggt cgaccacgga gctgcgcaag      60
gaaaagtccc gggatgcggc ccgcagccgg cgcagccagg agaccgaggt gctgtaccag     120
ctggctcaca cgctgccctt cgcccgcggc gtcagcgccc acctggacaa ggcctctatc     180
atgcgcctca ccatcagcta cctgcgcatg caccgcctct cgccgcagg ggagtggaac      240 caggtgggag caggggaga accactggat gcctgctacc tgaaggccct ggagggcttc     300
gtcatggtgc tcaccgccga gggagacatg gcttacctgt cggagaatgt cagcaaacac     360
ctgggcctca gtcagctgga gctcattgga cacagcatct ttgatttcat ccacccctgt     420
gaccaagagg agcttcagga cgccctgacc cccagcaga ccctgtccag gaggaaggtg     480
gaggccccca cggagcggtg cttctccttg cgcatgaaga gtacgctcac cagccgcggg     540 cgcacctca acctcaaggc ggccacctgg aaggtgctga actgctctgg acatatgagg     600
gcctacaagc cacctgcgca gacttctcca gctgggagcc ctgactcaga gccccgctg     660 cagtgcctgg tgctcatctg cgaagccatc ccccacccag gcagcctgga gcccccactg     720
ggccgagggg ccttcctcag ccgccacagc ctggacatga agttcaccta ctgtgacgac     780
aggattgcag aagtggctgg ctatagtccc gatgacctga tcggctgttc cgcctacgag     840
tacatccacg cgctggactc cgacgcggtc agcaagagca tccacacctg tatgtatccc     900 atttcccag gtgcgaagcc agctgccaca tggccccag ctgacaccag gaccccag     960 ctccccatac cccaggatgc actgcctccc cacctcaaca ccagctccct gctccccaag     1020
ccccaaggaa ctgtctccctt ccttgcccccc tcatacccag tccccagatc tttctctccc    1080
catttgcccc cttggtggcc ctgatc                                         1106

<210> SEQ ID NO 9
<211> LENGTH: 340
<212> TYPE: PRT
<213> ORGANISM: Homo sapiens

<400> SEQUENCE: 9

Met Asp Lys Phe Trp Trp His Ala Ala Trp Gly Leu Cys Leu Val Pro
1               5                   10                  15

Leu Ser Leu Ala Gln Ile Asp Leu Asn Ile Thr Cys Arg Phe Ala Gly
```

```
                20                  25                  30
    Val Phe His Val Glu Lys Asn Gly Arg Tyr Ser Ile Ser Arg Thr Glu
             35                  40                  45

Ala Ala Asp Leu Cys Lys Ala Phe Asn Ser Thr Leu Pro Thr Met Ala
     50                  55                  60

Gln Met Glu Lys Ala Leu Ser Ile Gly Phe Glu Thr Cys Arg Tyr Gly
     65                  70                  75                  80

Phe Ile Glu Gly His Val Val Ile Pro Arg Ile His Pro Asn Ser Ile
                     85                  90                  95

Cys Ala Ala Asn Asn Thr Gly Val Tyr Ile Leu Thr Ser Asn Thr Ser
                    100                 105                 110

Gln Tyr Asp Thr Tyr Cys Phe Asn Ala Ser Ala Pro Pro Glu Glu Asp
                    115                 120                 125

Cys Thr Ser Val Thr Asp Leu Pro Asn Ala Phe Asp Gly Pro Ile Thr
                    130                 135                 140

Ile Thr Ile Val Asn Arg Asp Gly Thr Arg Tyr Val Gln Lys Gly Glu
    145                 150                 155                 160

Tyr Arg Thr Asn Pro Glu Asp Ile Tyr Pro Ser Asn Pro Thr Asp Asp
                    165                 170                 175

Asp Val Ser Ser Gly Ser Ser Ser Glu Arg Ser Ser Thr Ser Gly Gly
                    180                 185                 190

Tyr Ile Phe Tyr Thr Phe Ser Thr Val His Pro Ile Pro Asp Glu Asp
                    195                 200                 205

Ser Pro Trp Ile Thr Asp Ser Thr Asp Arg Ile Pro Ala Thr Arg His
                    210                 215                 220

Ser His Gly Ser Gln Glu Gly Gly Ala Asn Thr Thr Ser Gly Pro Ile
    225                 230                 235                 240

Arg Thr Pro Gln Ile Pro Glu Trp Leu Ile Ile Leu Ala Ser Leu Leu
                    245                 250                 255

Ala Leu Ala Leu Ile Leu Ala Val Cys Ile Ala Val Asn Ser Arg Arg
                    260                 265                 270

Arg Cys Gly Gln Lys Lys Lys Leu Val Ile Asn Ser Gly Asn Gly Ala
                    275                 280                 285

Val Glu Asp Arg Lys Pro Ser Gly Leu Asn Gly Glu Ala Ser Lys Ser
                    290                 295                 300

Gln Glu Met Val His Leu Val Asn Lys Glu Ser Ser Glu Thr Pro Asp
    305                 310                 315                 320

Gln Phe Met Thr Ala Asp Glu Thr Arg Asn Leu Gln Asn Val Asp Met
                    325                 330                 335

Lys Ile Gly Val
                340

<210> SEQ ID NO 10
<211> LENGTH: 2556
<212> TYPE: PRT
<213> ORGANISM: Homo sapiens
<220> FEATURE:
<221> NAME/KEY: misc_feature
<222> LOCATION: (891)..(891)
<223> OTHER INFORMATION: Xaa can be any naturally occurring amino acid

<400> SEQUENCE: 10

Met Pro Pro Leu Leu Ala Pro Leu Leu Cys Leu Ala Leu Leu Pro Ala
1               5                   10                  15

Leu Ala Ala Arg Gly Pro Arg Cys Ser Gln Pro Gly Glu Thr Cys Leu
                20                  25                  30
```

```
Asn Gly Gly Lys Cys Glu Ala Ala Asn Gly Thr Glu Ala Cys Val Cys
         35                  40                  45

Gly Gly Ala Phe Val Gly Pro Arg Cys Gln Asp Pro Asn Pro Cys Leu
     50                  55                  60

Ser Thr Pro Cys Lys Asn Ala Gly Thr Cys His Val Val Asp Arg Arg
65                  70                  75                  80

Gly Val Ala Asp Tyr Ala Cys Ser Cys Ala Leu Gly Phe Ser Gly Pro
                 85                  90                  95

Leu Cys Leu Thr Pro Leu Asp Asn Ala Cys Leu Thr Asn Pro Cys Arg
             100                 105                 110

Asn Gly Gly Thr Cys Asp Leu Leu Thr Leu Thr Glu Tyr Lys Cys Arg
             115                 120                 125

Cys Pro Pro Gly Trp Ser Gly Lys Ser Cys Gln Gln Ala Asp Pro Cys
         130                 135                 140

Ala Ser Asn Pro Cys Ala Asn Gly Gly Gln Cys Leu Pro Phe Glu Ala
145                 150                 155                 160

Ser Tyr Ile Cys His Cys Pro Pro Ser Phe His Gly Pro Thr Cys Arg
                 165                 170                 175

Gln Asp Val Asn Glu Cys Gly Gln Lys Pro Arg Leu Cys Arg His Gly
             180                 185                 190

Gly Thr Cys His Asn Glu Val Gly Ser Tyr Arg Cys Val Cys Arg Ala
         195                 200                 205

Thr His Thr Gly Pro Asn Cys Glu Arg Pro Tyr Val Pro Cys Ser Pro
         210                 215                 220

Ser Pro Cys Gln Asn Gly Gly Thr Cys Arg Pro Thr Gly Asp Val Thr
225                 230                 235                 240

His Glu Cys Ala Cys Leu Pro Gly Phe Thr Gly Gln Asn Cys Glu Glu
                 245                 250                 255

Asn Ile Asp Asp Cys Pro Gly Asn Asn Cys Lys Asn Gly Gly Ala Cys
             260                 265                 270

Val Asp Gly Val Asn Thr Tyr Asn Cys Pro Cys Pro Pro Glu Trp Thr
         275                 280                 285

Gly Gln Tyr Cys Thr Glu Asp Val Asp Glu Cys Gln Leu Met Pro Asn
         290                 295                 300

Ala Cys Gln Asn Gly Gly Thr Cys His Asn Thr His Gly Gly Tyr Asn
305                 310                 315                 320

Cys Val Cys Val Asn Gly Trp Thr Gly Glu Asp Cys Ser Glu Asn Ile
                 325                 330                 335

Asp Asp Cys Ala Ser Ala Ala Cys Phe His Gly Ala Thr Cys His Asp
             340                 345                 350

Arg Val Ala Ser Phe Tyr Cys Glu Cys Pro His Gly Arg Thr Gly Leu
         355                 360                 365

Leu Cys His Leu Asn Asp Ala Cys Ile Ser Asn Pro Cys Asn Glu Gly
         370                 375                 380

Ser Asn Cys Asp Thr Asn Pro Val Asn Gly Lys Ala Ile Cys Thr Cys
385                 390                 395                 400

Pro Ser Gly Tyr Thr Gly Pro Ala Cys Ser Gln Asp Val Asp Glu Cys
                 405                 410                 415

Ser Leu Gly Ala Asn Pro Cys Glu His Ala Gly Lys Cys Ile Asn Thr
             420                 425                 430

Leu Gly Ser Phe Glu Cys Gln Cys Leu Gln Gly Tyr Thr Gly Pro Arg
         435                 440                 445
```

-continued

```
Cys Glu Ile Asp Val Asn Glu Cys Val Ser Asn Pro Cys Gln Asn Asp
    450                 455                 460
Ala Thr Cys Leu Asp Gln Ile Gly Glu Phe Gln Cys Met Cys Met Pro
465                 470                 475                 480
Gly Tyr Glu Gly Val His Cys Glu Val Asn Thr Asp Glu Cys Ala Ser
                485                 490                 495
Ser Pro Cys Leu His Asn Gly Arg Cys Leu Asp Lys Ile Asn Glu Phe
            500                 505                 510
Gln Cys Glu Cys Pro Thr Gly Phe Thr Gly His Leu Cys Gln Tyr Asp
        515                 520                 525
Val Asp Glu Cys Ala Ser Thr Pro Cys Lys Asn Gly Ala Lys Cys Leu
530                 535                 540
Asp Gly Pro Asn Thr Tyr Thr Cys Val Cys Thr Glu Gly Tyr Thr Gly
545                 550                 555                 560
Thr His Cys Glu Val Asp Ile Asp Glu Cys Asp Pro Asp Pro Cys His
                565                 570                 575
Tyr Gly Ser Cys Lys Asp Gly Val Ala Thr Phe Thr Cys Leu Cys Arg
            580                 585                 590
Pro Gly Tyr Thr Gly His His Cys Glu Thr Asn Ile Asn Glu Cys Ser
        595                 600                 605
Ser Gln Pro Cys Arg Leu Arg Gly Thr Cys Gln Asp Pro Asp Asn Ala
610                 615                 620
Tyr Leu Cys Phe Cys Leu Lys Gly Thr Thr Gly Pro Asn Cys Glu Ile
625                 630                 635                 640
Asn Leu Asp Asp Cys Ala Ser Ser Pro Cys Asp Ser Gly Thr Cys Leu
                645                 650                 655
Asp Lys Ile Asp Gly Tyr Glu Cys Ala Cys Glu Pro Gly Tyr Thr Gly
            660                 665                 670
Ser Met Cys Asn Ser Asn Ile Asp Glu Cys Ala Gly Asn Pro Cys His
        675                 680                 685
Asn Gly Gly Thr Cys Glu Asp Gly Ile Asn Gly Phe Thr Cys Arg Cys
690                 695                 700
Pro Glu Gly Tyr His Asp Pro Thr Cys Leu Ser Glu Val Asn Glu Cys
705                 710                 715                 720
Asn Ser Asn Pro Cys Val His Gly Ala Cys Arg Asp Ser Leu Asn Gly
                725                 730                 735
Tyr Lys Cys Asp Cys Asp Pro Gly Trp Ser Gly Thr Asn Cys Asp Ile
            740                 745                 750
Asn Asn Asn Glu Cys Glu Ser Asn Pro Cys Val Asn Gly Gly Thr Cys
        755                 760                 765
Lys Asp Met Thr Ser Gly Ile Val Cys Thr Cys Arg Glu Gly Phe Ser
770                 775                 780
Gly Pro Asn Cys Gln Thr Asn Ile Asn Glu Cys Ala Ser Asn Pro Cys
785                 790                 795                 800
Leu Asn Lys Gly Thr Cys Ile Asp Asp Val Ala Gly Tyr Lys Cys Asn
                805                 810                 815
Cys Leu Leu Pro Tyr Thr Gly Ala Thr Cys Glu Val Val Leu Ala Pro
            820                 825                 830
Cys Ala Pro Ser Pro Cys Arg Asn Gly Gly Glu Cys Arg Gln Ser Glu
        835                 840                 845
Asp Tyr Glu Ser Phe Ser Cys Val Cys Pro Thr Ala Gly Ala Lys Gly
850                 855                 860
Gln Thr Cys Glu Val Asp Ile Asn Glu Cys Val Leu Ser Pro Cys Arg
```

```
               865                 870                 875                 880
His Gly Ala Ser Cys Gln Asn Thr His Gly Xaa Tyr Arg Cys His Cys
                885                 890                 895
Gln Ala Gly Tyr Ser Gly Arg Asn Cys Glu Thr Asp Ile Asp Asp Cys
                900                 905                 910
Arg Pro Asn Pro Cys His Asn Gly Gly Ser Cys Thr Asp Gly Ile Asn
                915                 920                 925
Thr Ala Phe Cys Asp Cys Leu Pro Gly Phe Arg Gly Thr Phe Cys Glu
                930                 935                 940
Glu Asp Ile Asn Glu Cys Ala Ser Asp Pro Cys Arg Asn Gly Ala Asn
945                 950                 955                 960
Cys Thr Asp Cys Val Asp Ser Tyr Thr Cys Thr Cys Pro Ala Gly Phe
                965                 970                 975
Ser Gly Ile His Cys Glu Asn Asn Thr Pro Asp Cys Thr Glu Ser Ser
                980                 985                 990
Cys Phe Asn Gly Gly Thr Cys Val Asp Gly Ile Asn Ser Phe Thr Cys
                995                1000                1005
Leu Cys Pro Pro Gly Phe Thr Gly Ser Tyr Cys Gln His Val Val
               1010                1015                1020
Asn Glu Cys Asp Ser Arg Pro Cys Leu Leu Gly Gly Thr Cys Gln
               1025                1030                1035
Asp Gly Arg Gly Leu His Arg Cys Thr Cys Pro Gln Gly Tyr Thr
               1040                1045                1050
Gly Pro Asn Cys Gln Asn Leu Val His Trp Cys Asp Ser Ser Pro
               1055                1060                1065
Cys Lys Asn Gly Gly Lys Cys Trp Gln Thr His Thr Gln Tyr Arg
               1070                1075                1080
Cys Glu Cys Pro Ser Gly Trp Thr Gly Leu Tyr Cys Asp Val Pro
               1085                1090                1095
Ser Val Ser Cys Glu Val Ala Ala Gln Arg Gln Gly Val Asp Val
               1100                1105                1110
Ala Arg Leu Cys Gln His Gly Gly Leu Cys Val Asp Ala Gly Asn
               1115                1120                1125
Thr His His Cys Arg Cys Gln Ala Gly Tyr Thr Gly Ser Tyr Cys
               1130                1135                1140
Glu Asp Leu Val Asp Glu Cys Ser Pro Ser Pro Cys Gln Asn Gly
               1145                1150                1155
Ala Thr Cys Thr Asp Tyr Leu Gly Gly Tyr Ser Cys Lys Cys Val
               1160                1165                1170
Ala Gly Tyr His Gly Val Asn Cys Ser Glu Glu Ile Asp Glu Cys
               1175                1180                1185
Leu Ser His Pro Cys Gln Asn Gly Gly Thr Cys Leu Asp Leu Pro
               1190                1195                1200
Asn Thr Tyr Lys Cys Ser Cys Pro Arg Gly Thr Gln Gly Val His
               1205                1210                1215
Cys Glu Ile Asn Val Asp Asp Cys Asn Pro Pro Val Asp Pro Val
               1220                1225                1230
Ser Arg Ser Pro Lys Cys Phe Asn Asn Gly Thr Cys Val Asp Gln
               1235                1240                1245
Val Gly Gly Tyr Ser Cys Thr Cys Pro Pro Gly Phe Val Gly Glu
               1250                1255                1260
Arg Cys Glu Gly Asp Val Asn Glu Cys Leu Ser Asn Pro Cys Asp
               1265                1270                1275
```

```
Ala Arg Gly Thr Gln Asn Cys Val Gln Arg Val Asn Asp Phe His
    1280            1285            1290

Cys Glu Cys Arg Ala Gly His Thr Gly Arg Arg Cys Glu Ser Val
    1295            1300            1305

Ile Asn Gly Cys Lys Gly Lys Pro Cys Lys Asn Gly Gly Thr Cys
    1310            1315            1320

Ala Val Ala Ser Asn Thr Ala Arg Gly Phe Ile Cys Lys Cys Pro
    1325            1330            1335

Ala Gly Phe Glu Gly Ala Thr Cys Glu Asn Asp Ala Arg Thr Cys
    1340            1345            1350

Gly Ser Leu Arg Cys Leu Asn Gly Gly Thr Cys Ile Ser Gly Pro
    1355            1360            1365

Arg Ser Pro Thr Cys Leu Cys Leu Gly Pro Phe Thr Gly Pro Glu
    1370            1375            1380

Cys Gln Phe Pro Ala Ser Ser Pro Cys Leu Gly Gly Asn Pro Cys
    1385            1390            1395

Tyr Asn Gln Gly Thr Cys Glu Pro Thr Ser Glu Ser Pro Phe Tyr
    1400            1405            1410

Arg Cys Leu Cys Pro Ala Lys Phe Asn Gly Leu Leu Cys His Ile
    1415            1420            1425

Leu Asp Tyr Ser Phe Gly Gly Gly Ala Gly Arg Asp Ile Pro Pro
    1430            1435            1440

Pro Leu Ile Glu Glu Ala Cys Glu Leu Pro Glu Cys Gln Glu Asp
    1445            1450            1455

Ala Gly Asn Lys Val Cys Ser Leu Gln Cys Asn Asn His Ala Cys
    1460            1465            1470

Gly Trp Asp Gly Gly Asp Cys Ser Leu Asn Phe Asn Asp Pro Trp
    1475            1480            1485

Lys Asn Cys Thr Gln Ser Leu Gln Cys Trp Lys Tyr Phe Ser Asp
    1490            1495            1500

Gly His Cys Asp Ser Gln Cys Asn Ser Ala Gly Cys Leu Phe Asp
    1505            1510            1515

Gly Phe Asp Cys Gln Arg Ala Glu Gly Gln Cys Asn Pro Leu Tyr
    1520            1525            1530

Asp Gln Tyr Cys Lys Asp His Phe Ser Asp Gly His Cys Asp Gln
    1535            1540            1545

Gly Cys Asn Ser Ala Glu Cys Glu Trp Asp Gly Leu Asp Cys Ala
    1550            1555            1560

Glu His Val Pro Glu Arg Leu Ala Ala Gly Thr Leu Val Val Val
    1565            1570            1575

Val Leu Met Pro Pro Glu Gln Leu Arg Asn Ser Ser Phe His Phe
    1580            1585            1590

Leu Arg Glu Leu Ser Arg Val Leu His Thr Asn Val Val Phe Lys
    1595            1600            1605

Arg Asp Ala His Gly Gln Gln Met Ile Phe Pro Tyr Tyr Gly Arg
    1610            1615            1620

Glu Glu Glu Leu Arg Lys His Pro Ile Lys Arg Ala Ala Glu Gly
    1625            1630            1635

Trp Ala Ala Pro Asp Ala Leu Leu Gly Gln Val Lys Ala Ser Leu
    1640            1645            1650

Leu Pro Gly Gly Ser Glu Gly Gly Arg Arg Arg Arg Glu Leu Asp
    1655            1660            1665
```

```
Pro Met Asp Val Arg Gly Ser Ile Val Tyr Leu Glu Ile Asp Asn
1670             1675                 1680

Arg Gln Cys Val Gln Ala Ser Ser Gln Cys Phe Gln Ser Ala Thr
1685             1690                 1695

Asp Val Ala Ala Phe Leu Gly Ala Leu Ala Ser Leu Gly Ser Leu
1700             1705                 1710

Asn Ile Pro Tyr Lys Ile Glu Ala Val Gln Ser Glu Thr Val Glu
1715             1720                 1725

Pro Pro Pro Pro Ala Gln Leu His Phe Met Tyr Val Ala Ala Ala
1730             1735                 1740

Ala Phe Val Leu Leu Phe Phe Val Gly Cys Gly Val Leu Leu Ser
1745             1750                 1755

Arg Lys Arg Arg Arg Gln His Gly Gln Leu Trp Phe Pro Glu Gly
1760             1765                 1770

Phe Lys Val Ser Glu Ala Ser Lys Lys Lys Arg Arg Glu Pro Leu
1775             1780                 1785

Gly Glu Asp Ser Val Gly Leu Lys Pro Leu Lys Asn Ala Ser Asp
1790             1795                 1800

Gly Ala Leu Met Asp Asp Asn Gln Asn Glu Trp Gly Asp Glu Asp
1805             1810                 1815

Leu Glu Thr Lys Lys Phe Arg Phe Glu Pro Val Val Leu Pro
1820             1825                 1830

Asp Leu Asp Asp Gln Thr Asp His Arg Gln Trp Thr Gln Gln His
1835             1840                 1845

Leu Asp Ala Ala Asp Leu Arg Met Ser Ala Met Ala Pro Thr Pro
1850             1855                 1860

Pro Gln Gly Glu Val Asp Ala Asp Cys Met Asp Val Asn Val Arg
1865             1870                 1875

Gly Pro Asp Gly Phe Thr Pro Leu Met Ile Ala Ser Cys Ser Gly
1880             1885                 1890

Gly Gly Leu Glu Thr Gly Asn Ser Glu Glu Glu Asp Ala Pro
1895             1900                 1905

Ala Val Ile Ser Asp Phe Ile Tyr Gln Gly Ala Ser Leu His Asn
1910             1915                 1920

Gln Thr Asp Arg Thr Gly Glu Thr Ala Leu His Leu Ala Ala Arg
1925             1930                 1935

Tyr Ser Arg Ser Asp Ala Ala Lys Arg Leu Leu Glu Ala Ser Ala
1940             1945                 1950

Asp Ala Asn Ile Gln Asp Asn Met Gly Arg Thr Pro Leu His Ala
1955             1960                 1965

Ala Val Ser Ala Asp Ala Gln Gly Val Phe Gln Ile Leu Ile Arg
1970             1975                 1980

Asn Arg Ala Thr Asp Leu Asp Ala Arg Met His Asp Gly Thr Thr
1985             1990                 1995

Pro Leu Ile Leu Ala Ala Arg Leu Ala Val Glu Gly Met Leu Glu
2000             2005                 2010

Asp Leu Ile Asn Ser His Ala Asp Val Asn Ala Val Asp Asp Leu
2015             2020                 2025

Gly Lys Ser Ala Leu His Trp Ala Ala Ala Val Asn Asn Val Asp
2030             2035                 2040

Ala Ala Val Val Leu Leu Lys Asn Gly Ala Asn Lys Asp Met Gln
2045             2050                 2055

Asn Asn Arg Glu Glu Thr Pro Leu Phe Leu Ala Ala Arg Glu Gly
```

```
                    2060                2065                2070
Ser  Tyr  Glu  Thr  Ala  Lys  Val  Leu  Leu  Asp  His  Phe  Ala  Asn  Arg
         2075                2080                2085

Asp  Ile  Thr  Asp  His  Met  Asp  Arg  Leu  Pro  Arg  Asp  Ile  Ala  Gln
    2090                2095                2100

Glu  Arg  Met  His  His  Asp  Ile  Val  Arg  Leu  Leu  Asp  Glu  Tyr  Asn
    2105                2110                2115

Leu  Val  Arg  Ser  Pro  Gln  Leu  His  Gly  Ala  Pro  Leu  Gly  Gly  Thr
    2120                2125                2130

Pro  Thr  Leu  Ser  Pro  Pro  Leu  Cys  Ser  Pro  Asn  Gly  Tyr  Leu  Gly
    2135                2140                2145

Ser  Leu  Lys  Pro  Gly  Val  Gln  Gly  Lys  Lys  Val  Arg  Lys  Pro  Ser
    2150                2155                2160

Ser  Lys  Gly  Leu  Ala  Cys  Gly  Ser  Lys  Glu  Ala  Lys  Asp  Leu  Lys
    2165                2170                2175

Ala  Arg  Arg  Lys  Lys  Ser  Gln  Asp  Gly  Lys  Gly  Cys  Leu  Leu  Asp
    2180                2185                2190

Ser  Ser  Gly  Met  Leu  Ser  Pro  Val  Asp  Ser  Leu  Glu  Ser  Pro  His
    2195                2200                2205

Gly  Tyr  Leu  Ser  Asp  Val  Ala  Ser  Pro  Pro  Leu  Leu  Pro  Ser  Pro
    2210                2215                2220

Phe  Gln  Gln  Ser  Pro  Ser  Val  Pro  Leu  Asn  His  Leu  Pro  Gly  Met
    2225                2230                2235

Pro  Asp  Thr  His  Leu  Gly  Ile  Gly  His  Leu  Asn  Val  Ala  Ala  Lys
    2240                2245                2250

Pro  Glu  Met  Ala  Ala  Leu  Gly  Gly  Gly  Arg  Leu  Ala  Phe  Glu
    2255                2260                2265

Thr  Gly  Pro  Pro  Arg  Leu  Ser  His  Leu  Pro  Val  Ala  Ser  Gly  Thr
    2270                2275                2280

Ser  Thr  Val  Leu  Gly  Ser  Ser  Gly  Gly  Ala  Leu  Asn  Phe  Thr
    2285                2290                2295

Val  Gly  Gly  Ser  Thr  Ser  Leu  Asn  Gly  Gln  Cys  Glu  Trp  Leu  Ser
    2300                2305                2310

Arg  Leu  Gln  Ser  Gly  Met  Val  Pro  Asn  Gln  Tyr  Asn  Pro  Leu  Arg
    2315                2320                2325

Gly  Ser  Val  Ala  Pro  Gly  Pro  Leu  Ser  Thr  Gln  Ala  Pro  Ser  Leu
    2330                2335                2340

Gln  His  Gly  Met  Val  Gly  Pro  Leu  His  Ser  Ser  Leu  Ala  Ala  Ser
    2345                2350                2355

Ala  Leu  Ser  Gln  Met  Met  Ser  Tyr  Gln  Gly  Leu  Pro  Ser  Thr  Arg
    2360                2365                2370

Leu  Ala  Thr  Gln  Pro  His  Leu  Val  Gln  Thr  Gln  Gln  Val  Gln  Pro
    2375                2380                2385

Gln  Asn  Leu  Gln  Met  Gln  Gln  Gln  Asn  Leu  Gln  Pro  Ala  Asn  Ile
    2390                2395                2400

Gln  Gln  Gln  Gln  Ser  Leu  Gln  Pro  Pro  Pro  Pro  Pro  Gln  Pro
    2405                2410                2415

His  Leu  Gly  Val  Ser  Ser  Ala  Ala  Ser  Gly  His  Leu  Gly  Arg  Ser
    2420                2425                2430

Phe  Leu  Ser  Gly  Glu  Pro  Ser  Gln  Ala  Asp  Val  Gln  Pro  Leu  Gly
    2435                2440                2445

Pro  Ser  Ser  Leu  Ala  Val  His  Thr  Ile  Leu  Pro  Gln  Glu  Ser  Pro
    2450                2455                2460
```

```
Ala Leu Pro Thr Ser Leu Pro Ser Ser Leu Val Pro Pro Val Thr
    2465                2470                2475

Ala Ala Gln Phe Leu Thr Pro Pro Ser Gln His Ser Tyr Ser Ser
    2480                2485                2490

Pro Val Asp Asn Thr Pro Ser His Gln Leu Gln Val Pro Glu His
    2495                2500                2505

Pro Phe Leu Thr Pro Ser Pro Glu Ser Pro Asp Gln Trp Ser Ser
    2510                2515                2520

Ser Ser Pro His Ser Asn Val Ser Asp Trp Ser Glu Gly Val Ser
    2525                2530                2535

Ser Pro Pro Thr Ser Met Gln Ser Gln Ile Ala Arg Ile Pro Glu
    2540                2545                2550

Ala Phe Lys
    2555

<210> SEQ ID NO 11
<211> LENGTH: 363
<212> TYPE: PRT
<213> ORGANISM: Homo sapiens

<400> SEQUENCE: 11

Met Ala Leu Gly Leu Gln Arg Ala Arg Ser Thr Thr Glu Leu Arg Lys
1               5                   10                  15

Glu Lys Ser Arg Asp Ala Ala Arg Ser Arg Arg Ser Gln Glu Thr Glu
                20                  25                  30

Val Leu Tyr Gln Leu Ala His Thr Leu Pro Phe Ala Arg Gly Val Ser
            35                  40                  45

Ala His Leu Asp Lys Ala Ser Ile Met Arg Leu Thr Ile Ser Tyr Leu
        50                  55                  60

Arg Met His Arg Leu Cys Ala Ala Gly Glu Trp Asn Gln Val Gly Ala
65                  70                  75                  80

Gly Gly Glu Pro Leu Asp Ala Cys Tyr Leu Lys Ala Leu Glu Gly Phe
                85                  90                  95

Val Met Val Leu Thr Ala Glu Gly Asp Met Ala Tyr Leu Ser Glu Asn
            100                 105                 110

Val Ser Lys His Leu Gly Leu Ser Gln Leu Glu Leu Ile Gly His Ser
        115                 120                 125

Ile Phe Asp Phe Ile His Pro Cys Asp Gln Glu Glu Leu Gln Asp Ala
    130                 135                 140

Leu Thr Pro Gln Gln Thr Leu Ser Arg Arg Lys Val Glu Ala Pro Thr
145                 150                 155                 160

Glu Arg Cys Phe Ser Leu Arg Met Lys Ser Thr Leu Thr Ser Arg Gly
                165                 170                 175

Arg Thr Leu Asn Leu Lys Ala Ala Thr Trp Lys Val Leu Asn Cys Ser
            180                 185                 190

Gly His Met Arg Ala Tyr Lys Pro Pro Ala Gln Thr Ser Pro Ala Gly
        195                 200                 205

Ser Pro Asp Ser Glu Pro Pro Leu Gln Cys Leu Val Leu Ile Cys Glu
    210                 215                 220

Ala Ile Pro His Pro Gly Ser Leu Glu Pro Leu Gly Arg Gly Ala
225                 230                 235                 240

Phe Leu Ser Arg His Ser Leu Asp Met Lys Phe Thr Tyr Cys Asp Asp
                245                 250                 255

Arg Ile Ala Glu Val Ala Gly Tyr Ser Pro Asp Asp Leu Ile Gly Cys
```

```
                     260                 265                 270
Ser Ala Tyr Glu Tyr Ile His Ala Leu Asp Ser Asp Ala Val Ser Lys
                275                 280                 285

Ser Ile His Thr Cys Met Tyr Pro Ile Ser Pro Gly Ala Lys Pro Ala
                290                 295                 300

Ala Thr Trp Pro Pro Ala Asp Thr Arg Thr Pro Gln Leu Pro Ile Pro
305                 310                 315                 320

Gln Asp Ala Leu Pro Pro His Leu Asn Thr Ser Ser Leu Leu Pro Lys
                325                 330                 335

Pro Gln Gly Thr Val Ser Phe Leu Ala Pro Ser Tyr Pro Val Pro Arg
                340                 345                 350

Ser Phe Ser Pro His Leu Pro Pro Trp Trp Pro
                355                 360

<210> SEQ ID NO 12
<211> LENGTH: 30
<212> TYPE: DNA
<213> ORGANISM: Artificial Sequence
<220> FEATURE:
<223> OTHER INFORMATION: Primer (CD44_SwaI-F)

<400> SEQUENCE: 12
accatttaaa tatggacaag ttttggtggc                                    30

<210> SEQ ID NO 13
<211> LENGTH: 29
<212> TYPE: DNA
<213> ORGANISM: Artificial Sequence
<220> FEATURE:
<223> OTHER INFORMATION: Primer (HIF-3a4_SwaI-R)

<400> SEQUENCE: 13
cggatttaaa ttcagggcca ccaagggggg                                    29

<210> SEQ ID NO 14
<211> LENGTH: 26
<212> TYPE: DNA
<213> ORGANISM: Artificial Sequence
<220> FEATURE:
<223> OTHER INFORMATION: Primer (pAxCAwtit2_seq-F1)

<400> SEQUENCE: 14
gcggctctag agcctctgct aaccat                                        26

<210> SEQ ID NO 15
<211> LENGTH: 26
<212> TYPE: DNA
<213> ORGANISM: Artificial Sequence
<220> FEATURE:
<223> OTHER INFORMATION: Primer (pAxCAwtit2_seq-F2)

<400> SEQUENCE: 15
ggacaagttt tggtggcacg cagcct                                        26

<210> SEQ ID NO 16
<211> LENGTH: 26
<212> TYPE: DNA
<213> ORGANISM: Artificial Sequence
<220> FEATURE:
<223> OTHER INFORMATION: Primer (pAxCAwtit2_seq-F3)

<400> SEQUENCE: 16
cctgaagaca tctaccccag caaccc                                        26
```

<210> SEQ ID NO 17
<211> LENGTH: 26
<212> TYPE: DNA
<213> ORGANISM: Artificial Sequence
<220> FEATURE:
<223> OTHER INFORMATION: Primer (pAxCAwtit2_seq-F4)

<400> SEQUENCE: 17
tgcctcttcg acggctttga ctgcca                                    26

<210> SEQ ID NO 18
<211> LENGTH: 26
<212> TYPE: DNA
<213> ORGANISM: Artificial Sequence
<220> FEATURE:
<223> OTHER INFORMATION: pAxCAwtit2_seq-F5

<400> SEQUENCE: 18
ggagattgac aaccggcagt gtgtgc                                    26

<210> SEQ ID NO 19
<211> LENGTH: 26
<212> TYPE: DNA
<213> ORGANISM: Artificial Sequence
<220> FEATURE:
<223> OTHER INFORMATION: Primer (pAxCAwtit2_seq-F6)

<400> SEQUENCE: 19
tcatgcgcct caccatcagc tacctg                                    26

<210> SEQ ID NO 20
<211> LENGTH: 26
<212> TYPE: DNA
<213> ORGANISM: Artificial Sequence
<220> FEATURE:
<223> OTHER INFORMATION: Primer (pAxCAwtit2_seq-F7)

<400> SEQUENCE: 20
acaagccacc tgcgcagact tctcca                                    26

<210> SEQ ID NO 21
<211> LENGTH: 26
<212> TYPE: DNA
<213> ORGANISM: Artificial Sequence
<220> FEATURE:
<223> OTHER INFORMATION: Primer (pAxCAwtit2_seq-R)

<400> SEQUENCE: 21
gctcaagggg cttcatgatg tcccca                                    26

<210> SEQ ID NO 22
<211> LENGTH: 20
<212> TYPE: DNA
<213> ORGANISM: Artificial Sequence
<220> FEATURE:
<223> OTHER INFORMATION: Primer (Bcl-xL Forward)

<400> SEQUENCE: 22
cccagaaagg atacagctgg                                           20

<210> SEQ ID NO 23
<211> LENGTH: 20
<212> TYPE: DNA
<213> ORGANISM: Artificial Sequence
<220> FEATURE:

<223> OTHER INFORMATION: Primer (Bcl-xL Reverse)

<400> SEQUENCE: 23
gcgatccgac tcaccaatac                                           20

<210> SEQ ID NO 24
<211> LENGTH: 22
<212> TYPE: DNA
<213> ORGANISM: Artificial Sequence
<220> FEATURE:
<223> OTHER INFORMATION: Primer (CCL2 Forward)

<400> SEQUENCE: 24
aagatctcag tgcagaggct cg                                        22

<210> SEQ ID NO 25
<211> LENGTH: 21
<212> TYPE: DNA
<213> ORGANISM: Artificial Sequence
<220> FEATURE:
<223> OTHER INFORMATION: Primer (CCL2 Reverse)

<400> SEQUENCE: 25
ttgcttgtcc aggtggtcca t                                         21

<210> SEQ ID NO 26
<211> LENGTH: 23
<212> TYPE: DNA
<213> ORGANISM: Artificial Sequence
<220> FEATURE:
<223> OTHER INFORMATION: Primer (CyclinG2 Forward)

<400> SEQUENCE: 26
gctgaaagct tgcaactgcc gac                                       23

<210> SEQ ID NO 27
<211> LENGTH: 23
<212> TYPE: DNA
<213> ORGANISM: Artificial Sequence
<220> FEATURE:
<223> OTHER INFORMATION: Primer (CyclinG2 Reverse)

<400> SEQUENCE: 27
ggtatcgttg gcagctcagg aac                                       23

<210> SEQ ID NO 28
<211> LENGTH: 20
<212> TYPE: DNA
<213> ORGANISM: Artificial Sequence
<220> FEATURE:
<223> OTHER INFORMATION: Primer (HIF-3a4 Forward)

<400> SEQUENCE: 28
gggagacatg gcttacctgt                                           20

<210> SEQ ID NO 29
<211> LENGTH: 20
<212> TYPE: DNA
<213> ORGANISM: Artificial Sequence
<220> FEATURE:
<223> OTHER INFORMATION: Primer (HIF-3a4 Reverse)

<400> SEQUENCE: 29
gcgtactctt catgcgcaag                                           20

```
<210> SEQ ID NO 30
<211> LENGTH: 26
<212> TYPE: DNA
<213> ORGANISM: Artificial Sequence
<220> FEATURE:
<223> OTHER INFORMATION: Primer (p53 Forward)

<400> SEQUENCE: 30
cagccaagtc tgtgacttgc acgtac                                          26

<210> SEQ ID NO 31
<211> LENGTH: 26
<212> TYPE: DNA
<213> ORGANISM: Artificial Sequence
<220> FEATURE:
<223> OTHER INFORMATION: Primer (p53 Reverse)

<400> SEQUENCE: 31
ctatgtcgaa aagtgtttct gtcatc                                          26

<210> SEQ ID NO 32
<211> LENGTH: 20
<212> TYPE: DNA
<213> ORGANISM: Artificial Sequence
<220> FEATURE:
<223> OTHER INFORMATION: Primer (SOCS3 Forward)

<400> SEQUENCE: 32
gaccagcgcc acttcttcac                                                 20

<210> SEQ ID NO 33
<211> LENGTH: 19
<212> TYPE: DNA
<213> ORGANISM: Artificial Sequence
<220> FEATURE:
<223> OTHER INFORMATION: Primer (SOCS3 Reverse)

<400> SEQUENCE: 33
ctggatgcgc aggttcttg                                                  19

<210> SEQ ID NO 34
<211> LENGTH: 21
<212> TYPE: DNA
<213> ORGANISM: Artificial Sequence
<220> FEATURE:
<223> OTHER INFORMATION: Primer (Survivin Forward)

<400> SEQUENCE: 34
agaactggcc cttcttggag g                                               21

<210> SEQ ID NO 35
<211> LENGTH: 24
<212> TYPE: DNA
<213> ORGANISM: Artificial Sequence
<220> FEATURE:
<223> OTHER INFORMATION: Primer (Survivin Reverse)

<400> SEQUENCE: 35
ctttttatgt tcctctatgg ggtc                                            24

<210> SEQ ID NO 36
<211> LENGTH: 20
<212> TYPE: DNA
<213> ORGANISM: Artificial Sequence
<220> FEATURE:
<223> OTHER INFORMATION: Primer (VEGF Forward)
```

```
<400> SEQUENCE: 36
gggcctccga aaccatgaac                                                    20

<210> SEQ ID NO 37
<211> LENGTH: 20
<212> TYPE: DNA
<213> ORGANISM: Artificial Sequence
<220> FEATURE:
<223> OTHER INFORMATION: Primer (VEGF Reverse)

<400> SEQUENCE: 37
caaggctcca atgcacccaa                                                    20

<210> SEQ ID NO 38
<211> LENGTH: 25
<212> TYPE: DNA
<213> ORGANISM: Artificial Sequence
<220> FEATURE:
<223> OTHER INFORMATION: Primer (TBP Forward)

<400> SEQUENCE: 38
gccagcttcg gagagttctg ggatt                                              25

<210> SEQ ID NO 39
<211> LENGTH: 25
<212> TYPE: DNA
<213> ORGANISM: Artificial Sequence
<220> FEATURE:
<223> OTHER INFORMATION: Primer (TBP Reverse)

<400> SEQUENCE: 39
cgggcacgaa gtgcaatggt cttta                                              25
```